US009765599B2

(12) United States Patent
Bittar et al.

(10) Patent No.: US 9,765,599 B2
(45) Date of Patent: Sep. 19, 2017

(54) MILLING WELL CASING USING ELECTROMAGNETIC PULSE

(71) Applicant: Halliburton Energy Services, Inc., Houston, TX (US)

(72) Inventors: Michael Bittar, Houston, TX (US); Jing Li, Pearland, TX (US); Daniel Dorffer, Houston, TX (US); Clive Menezes, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/162,273

(22) Filed: May 23, 2016

(65) Prior Publication Data

US 2016/0265320 A1 Sep. 15, 2016

Related U.S. Application Data

(62) Division of application No. 13/879,319, filed as application No. PCT/US2010/056348 on Nov. 11, 2010, now Pat. No. 9,371,718.

(51) Int. Cl.
*E21B 43/11* (2006.01)
*E21B 17/08* (2006.01)
(Continued)

(52) U.S. Cl.
CPC .............. *E21B 43/11* (2013.01); *E21B 17/00* (2013.01); *E21B 17/08* (2013.01);
(Continued)

(58) Field of Classification Search
CPC ...... E21B 43/11; E21B 43/119; E21B 17/028; E21B 17/1078; E21B 33/12; E21B 17/00;
(Continued)

(56) References Cited

U.S. PATENT DOCUMENTS 2,730,599 A * 1/1956 Ronay .................... B23K 13/00 219/611
3,689,725 A * 9/1972 Hammer ............. B23K 13/025 219/612
(Continued)

OTHER PUBLICATIONS

Examination Report issued for Australian Patent Application No. 2010363647, dated May 6, 2015.
(Continued)

*Primary Examiner* — Robert E Fuller
*Assistant Examiner* — Christopher Sebesta
(74) *Attorney, Agent, or Firm* — Haynes and Boone, LLP

(57) ABSTRACT

An electromagnetic perforation device for well casings includes a coil disposed around a core carried by a mandrel. The device further includes a power supply coupled to a current supply device, which is coupled to said coil. A stabilizing member extends from the mandrel and spaced apart on the mandrel from the coil core. The electromagnetic performance device may be positioned in a well casing, and the current supply device may rapidly supply a current to the coil to created an electromagnetic field in the coil and simultaneously induces a magnetic field in the well casing. The coil, current, and well casing may be selected such that electromagnetic field and the magnetic field produce repulsive magnetic forces that are sufficient to overcome a yield strength of the well casing and perforate the well casing.

19 Claims, 29 Drawing Sheets

(51) Int. Cl.

| | |
|---|---|
| ***E21B 17/10*** | (2006.01) |
| ***H01F 7/06*** | (2006.01) |
| *E21B 17/00* | (2006.01) |
| *E21B 17/02* | (2006.01) |
| *E21B 33/12* | (2006.01) |
| *E21B 47/06* | (2012.01) |

(52) U.S. Cl.
CPC ......... *E21B 17/1078* (2013.01); *H01F 7/064* (2013.01); *E21B 17/003* (2013.01); *E21B 17/028* (2013.01); *E21B 33/12* (2013.01); *E21B 47/06* (2013.01)

(58) Field of Classification Search
CPC ........ E21B 17/08; E21B 17/003; E21B 47/06; H01F 7/064
See application file for complete search history.

(56) References Cited

U.S. PATENT DOCUMENTS

| | | | | |
|---|---|---|---|---|
| 3,823,589 A | | 7/1974 | Tikhonovich et al. | |
| 4,170,887 A | | 10/1979 | Baranov | |
| 4,268,736 A | * | 5/1981 | Cuvelier | B23K 13/025 219/613 |
| 4,596,516 A | | 6/1986 | Scott et al. | |
| 5,535,828 A | | 7/1996 | Kinderen et al. | |
| 5,971,072 A | * | 10/1999 | Huber | E21B 17/028 166/297 |
| 6,078,031 A | * | 6/2000 | Bliault | B23K 13/025 219/607 |
| 6,353,706 B1 | | 3/2002 | Bridges | |
| 6,543,539 B1 | | 4/2003 | Vinegar et al. | |
| 2003/0098157 A1 | * | 5/2003 | Hales | E21B 43/1185 166/297 |
| 2007/0018848 A1 | | 1/2007 | Bottos et al. | |
| 2009/0199402 A1 | | 8/2009 | Muroya et al. | |

OTHER PUBLICATIONS

International Search Report and Written Opinion issued in PCT Application No. PCT/US201/056348, dated Mar. 9, 2012, 13 pages.
Office Action issued for Canadian Patent Application No. 2,815,180, dated Jul. 24, 2014.

* cited by examiner

MILLING WELL CASING USING ELECTROMAGNETIC PULSE

PRIORITY

The present application is a divisional patent application of U.S. patent application Ser. No. 13/879,319, filed on Apr. 12, 2013, which is a U.S. National Stage patent application of International Patent Application No. PCT/US2010/056348, filed on Nov. 11, 2010, the benefit of which is claimed and disclosures of which are hereby incorporated by reference in their entirety.

BACKGROUND

The present disclosure relates generally to drilling, and more particularly to an electromagnetic perforation device used in drilling.

The conventional design and construction of a wellbore is well known by those of skill in the art. Open hole portions are drilled into a reservoir formation, and a well casing or liner is run into the open hole portions and cemented in place in order to isolate the formation and stabilize the wellbore. One or more perforations are then created through the well casing into the reservoir formation to allow oil or gas to be removed through the well casing from the reservoir formation.

Traditionally, perforations through the well casing into the reservoir formation are created using perforating guns equipped with shaped explosive charges. A perforating gun may be lowered into the well casing on wireline, tubing, or coiled tubing to the location in the well casing where the perforations are desired. The shaped explosive charged on the perforating gun is then detonated, which produces an extremely high pressure jet that penetrates the well casing and the reservoir formation and allows the oil or gas in the reservoir formation to enter the well casing and be extracted from the reservoir formation. The use of explosive charges to create the perforations results in debris in the system, and carries with it all the dangers and costs associated with the shipping and handling of explosives.

Accordingly, it would be desirable to provide an improved device for creating perforations in a well casing.

DETAILED DESCRIPTION

Figure 1:
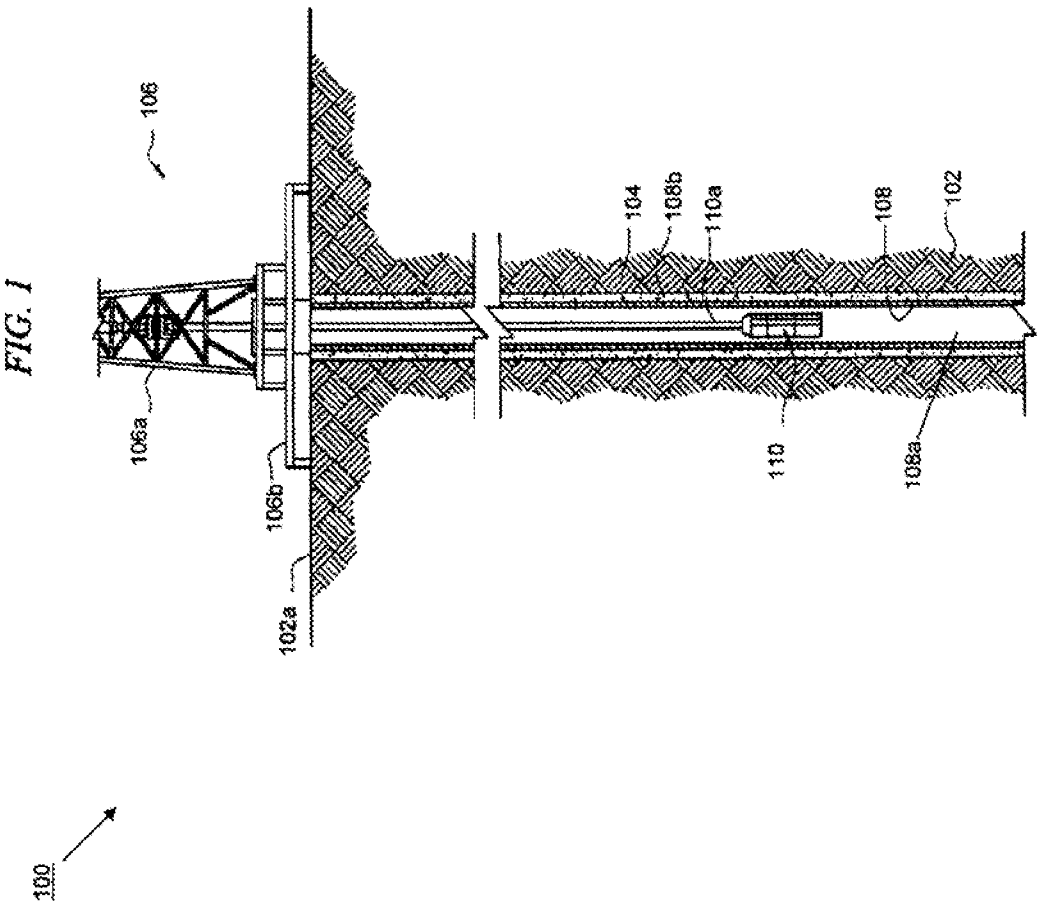
FIG. 1 is a cross-sectional view illustrating a well.

Referring initially to FIG. 1, well 100 is illustrated. The well 100 includes a formation 102 having a surface 102*a*. A wellbore 104 is defined in the formation 102 and may be created by drilling and/or other techniques known in the art. A drilling station 106 that may include a derrick 106*a* and a drill floor 106*b* is located on the surface 102*a* of the formation 102 adjacent the wellbore 104 and may include drilling components and/or other components known in the art. A generally tubular well casing 108 that defines a casing passageway 108*a* is located, in the wellbore 104 and may be cemented 108*b* into position against the formation 102 in a conventional manner. In an embodiment, at least a portion of the well casing 108 is fabricated from a material sufficiently conductive so as to permit a magnetic field to be generated therein. In a non-limiting example, in a preferred embodiment, casing 108 may be formed of steel, stainless steel, aluminum, titanium or similar metallic material. A tool 110 may be positioned in the casing passageway 108*a* using a string 110*a* that extends from the drilling station 106. The illustration of the well 100 in FIG. 1 has been simplified for clarity of discussion, and one of skill in the art will recognize that features of the well 100 may be added, removed, and modified without departing from the scope of the present disclosure. For example, the well 100 may be based on a body of water such that the formation 102 is located beneath the body of water and the drilling station 106 is located above the body of water. In another example, the wellbore 104 may be in different orientations (e.g., horizontal, partially horizontal, etc) than illustrated in FIG. 1.

Figure 2A:
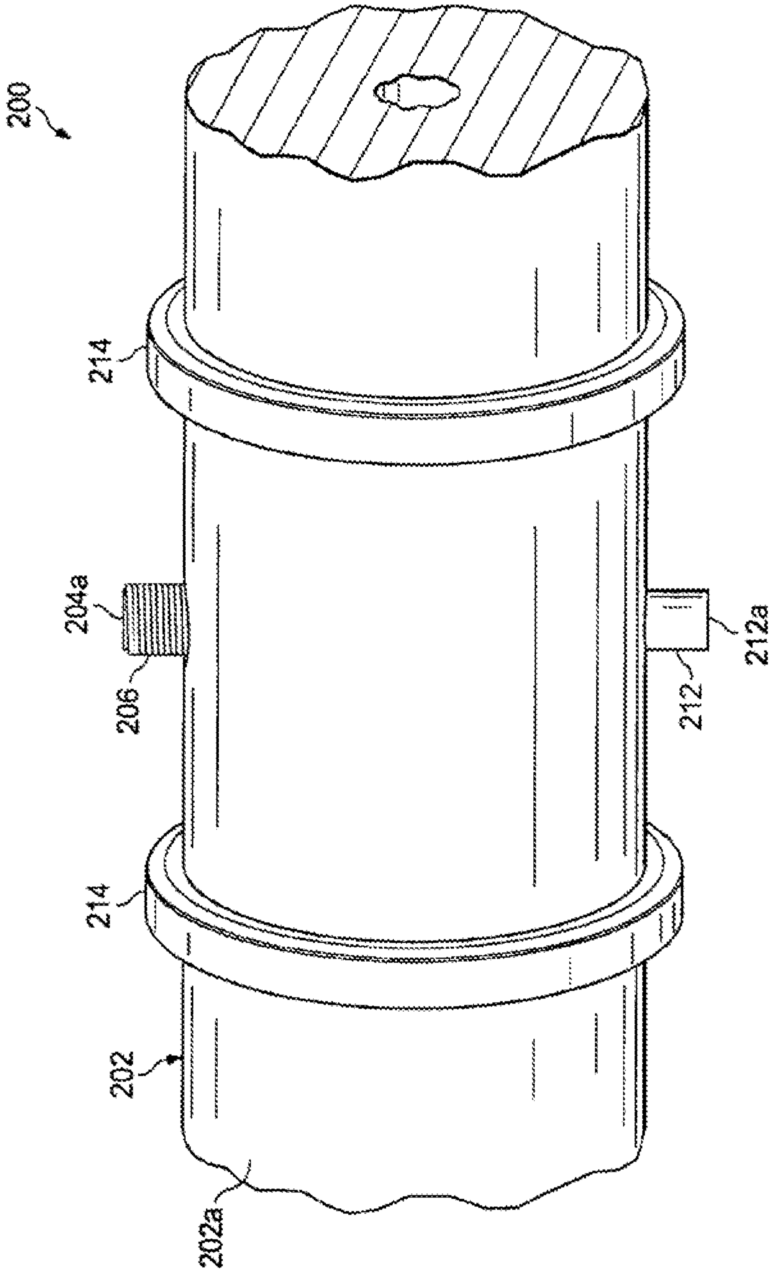
FIG. 2*a* is a perspective view illustrating an embodiment of a electromagnetic perforation device for use in the well of FIG. 1.
Figure 2B:
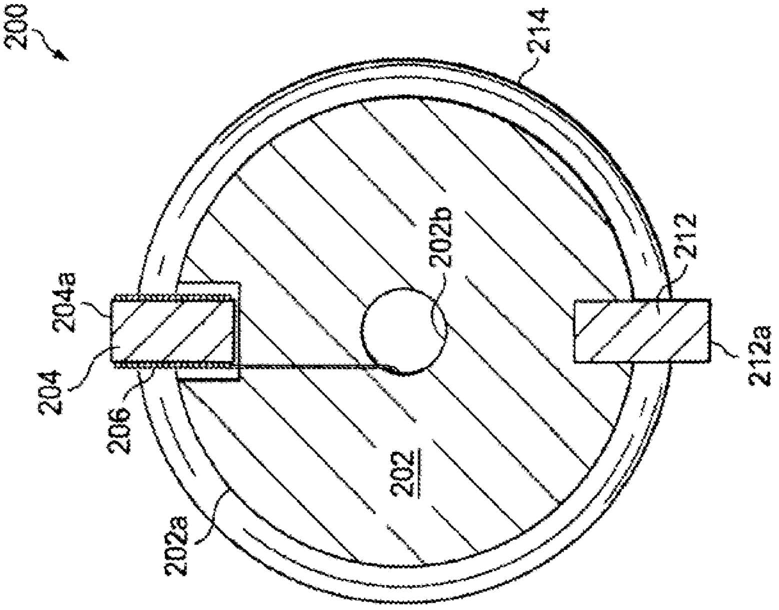
FIG. 2*b* is a cross-sectional view illustrating an embodiment of the electromagnetic perforation device of FIG. 2*a*.
Figure 2C:
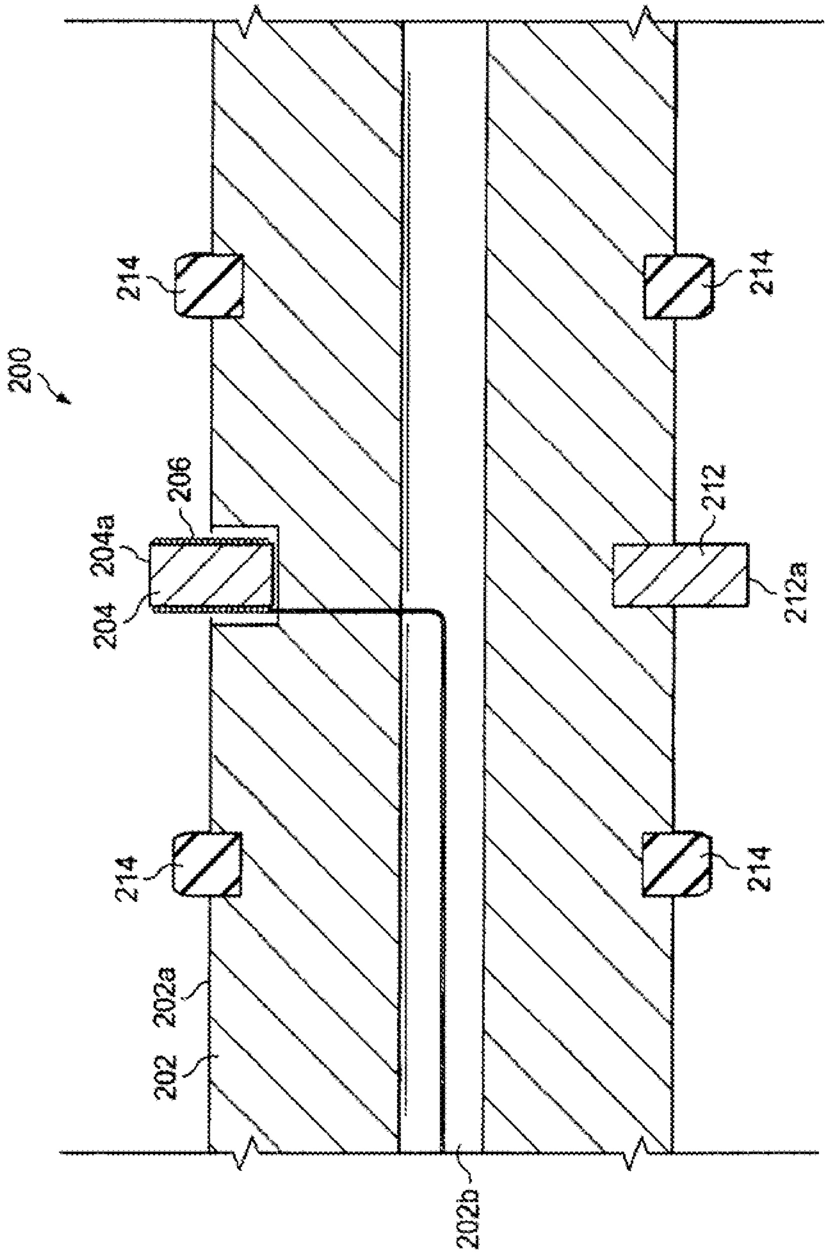
FIG. 2*c* is a cross-sectional view illustrating an embodiment of the electromagnetic perforation device of FIG. 2*a*.
Figure 2D:
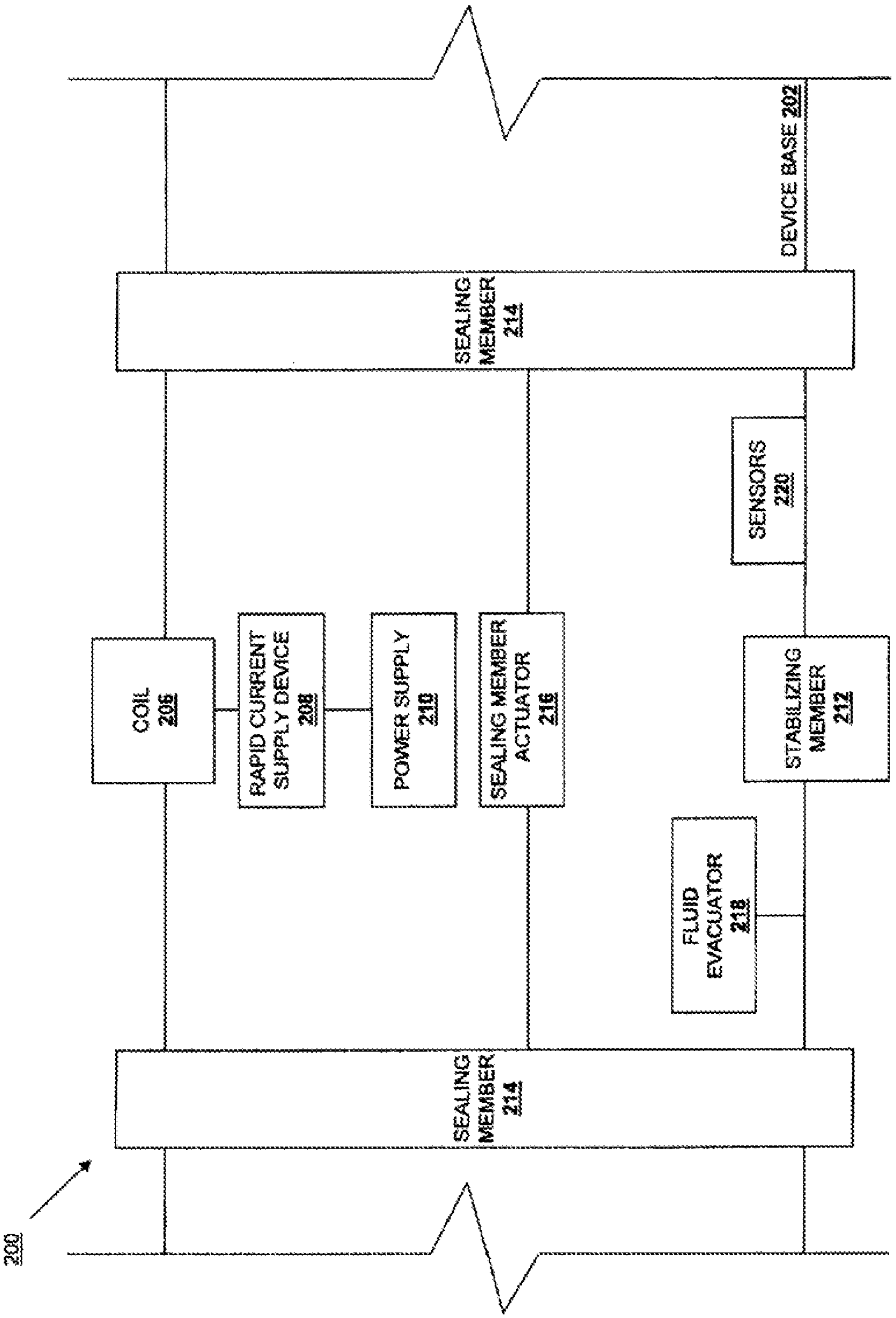
FIG. 2*d* is a schematic view illustrating an embodiment of the electromagnetic perforation device of FIG. 2*a*.

Referring now to FIGS. 2*a*, 2*b*, and 2*c*, an electromagnetic perforation device or tool 200 is illustrated. In an embodiment, the electromagnetic perforation device 200 may be the tool 110 or part of the tool 110, described above with reference to FIG. 1, and may include other devices known in the art. For example, device 200 may be incorporated as part of a drill string, or positioned adjacent other tools. In another embodiment, the electromagnetic perforation device 200 is a standalone tool that may be lowered on coiled tubing, wireline, slickline or the like. The electromagnetic perforation device 201) includes a generally elongated cylindrical tool body or mandrel 202 having an outer surface 202*a*. Mandrel 202 may include an interior passageway 202*b*. A coil core 204 may extend from mandrel 202 and includes a distal end 204*a*. In an embodiment, the coil core 204 may be fabricated from a nonconductive material with strong mechanical strength such as, for example, a ceramic material, while in another embodiment, the coil core 204 may be fabricated of a conductive or semi-conductive material. In an embodiment, the coil core 204 has a generally cylindrical shape with a circular, solid cross-section, while in another embodiment, coil core 204 is tubular. In an embodiment, the coil core 204 may include a variety of shapes such as, for example, a standard coil shape, a helical shape, and/or a variety of other shapes known in the art. A coil 206 is located on the coil core 204 and, in the illustrated embodiment, extends along the coil core 204 to the distal end 204*a* of the coil core 204. In an embodiment, the coil 206 may include a single coil or a plurality of coils. In an embodiment, the coil 206 may have one turn or a plurality of turns. In an embodiment, the coil 206 is mounted to the coil core 204 in a manner that substantially prevents movement of the coil 206 relative to the coil core 204 or the mandrel 202. Those skilled in the art will appreciate that mandrel 202 may be of any shape or size so long as it forms a base for carrying the electromagnetic elements as described herein.

Referring now to FIGS. 2*a*, 2*b*, 2*c*, and 2*d*, the coil 206 is electrically coupled to a current supply device 208. In an embodiment, the current supply device 208 may be located in the mandrel 202 or carried by an adjacent mandrel. In an embodiment, the current supply device 208 may be located adjacent the surface (e.g., at the drilling station 106, described with reference to FIG. 1) and coupled to the coil 206 using methods known in the art such as conductors. In an embodiment, the current supply device 208 may be a capacitor, a plurality of capacitors, a capacitor bank, one or more ultracapacitors such as, for example, electric double-layer capacitors or electrochemical capacitors, and/or a variety of other devices known in the art that are operable to rapidly discharge to produce a rapidly changing magnetic field in coil 206. The current supply device 208 is coupled to a power supply 210. In an embodiment, the power supply 210 may be located in the mandrel 202 (not shown) or carried by an adjacent mandrel. In an embodiment, the power supply 210 may be located adjacent the surface (e.g., at the drilling station 106, described with reference to FIG. 1) and coupled to the current supply device 208 using methods known in the art such as conductors. In an embodiment, the power supply 210 may include a battery or a plurality of batteries. A stabilizing member 212 extends from the mandrel 202 and includes a distal end 212*a*. In the illustrated embodiment, the stabilizing member 212 is located on an opposite side of the mandrel 202 from the coil 206. While the illustrated embodiment of the invention includes a stabilizing member 212, those skilled in the art will appreciate that a stabilizing member is not necessary to practice the invention. Rather, mandrel 202 can be positioned to abut the casing opposite the coil core 204 to provide stabilization using, for example, a variety of extensions known in the art that extend out to engage the easing 108. While the particular current, voltage and frequency requirements for a particular application will vary depending on the parameters of the application, such as for example, casing thickness, in one embodiment, the coil may be excited with a large current (e.g. 100 KA or more) at a high-voltage (for instance, 10 kV), and a high-frequency (e.g., 30 kHz or more) half sine wave pulses.

A plurality of sealing members 214 may be employed to seal off a work zone. In such embodiments, seal members 214 are located adjacent the outer surface 202*a* of the mandrel 202 and about the circumference of the mandrel 202 in a spaced apart orientation from each other such that the coil core 204, the coil 206 and the stabilizing member 212 are located on the mandrel 202 between two of the sealing members 214. In an embodiment, the stabilizing member 212 may not be located between two of the sealing members 214. In the illustrated embodiment, the seal members 214 are packers that are operable to expand such that they may extend from the mandrel 202 and provide a seal between the mandrel 202 and a well casing. As such, the sealing members 214 are coupled to a sealing member actuator 216 that is operable to expand the packers by methods known in the art. However, while the sealing members 214 have been illustrated and described as packers, the scaling members 214 may also include snorkels, sealing pads, and/or a variety of other sealing members known in the art that may be used to seal the wellbore around the coil 206. For example, the coil 206 may be disposed on a snorkel that extends into engagement with the casing 108, with a sealing member disposed around the circumference of the coil 206 to seal against the casing 108, as described in further detail below.

A fluid evacuator 218 carried by the mandrel 202 and is operable to remove a fluid from the annulus formed between the sealing members 214, the mandrel 202, and the well casing. In another embodiment, a fluid evacuator 218 may be coupled to a snorkel and operable to remove a fluid from a volume located within a seal formed by a sealing pad and the casing 108, as described in further detail below. In an embodiment, the fluid evacuator 218 includes a pump. One or more sensors carried by the mandrel 220 and operable to monitor and/or detect a variety of conditions such as, for example, temperature, pressure, position of the mandrel 202 relative to a well casing, presence of a well casing, and/or a variety of other conditions known in the art. A control system (not illustrated) may be coupled to the current supply device 208, the power supply 210, the sealing member actuator 216, the fluid evacuator 218, and the sensors 220. In an embodiment, the control system may be earned by the mandrel 202 and actuated locally or from the drilling station 106 using methods known in the art (e.g., a wire or wireless connection). In an embodiment, the control system may be located at the drilling station 106 and coupled to the current supply device 208, the power supply 210, the sealing member actuator 216, the fluid evacuator 218, and the sensors 220 using methods known in the art (e.g., a wire or wireless connection). In an embodiment, one or more components of the device 200 and the drilling system described below may be coupled together through conductors or other means that run through the casing passageway 108*a* and/or the device passageway 202*b*. The control system may include a central processing unit (CPU), other microprocessors, random access memory (RAM), secondary memory, drive controllers, and the like.

Figure 3A:
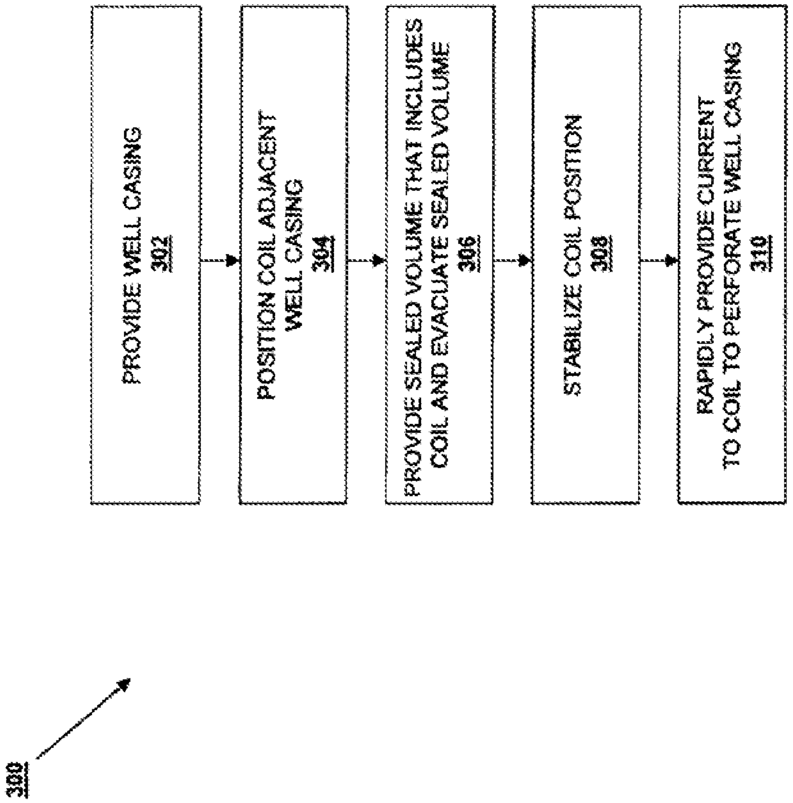
FIG. 3*a* is a flow chart illustrating an embodiment of a method for perforating a well casing.
Figure 3B:
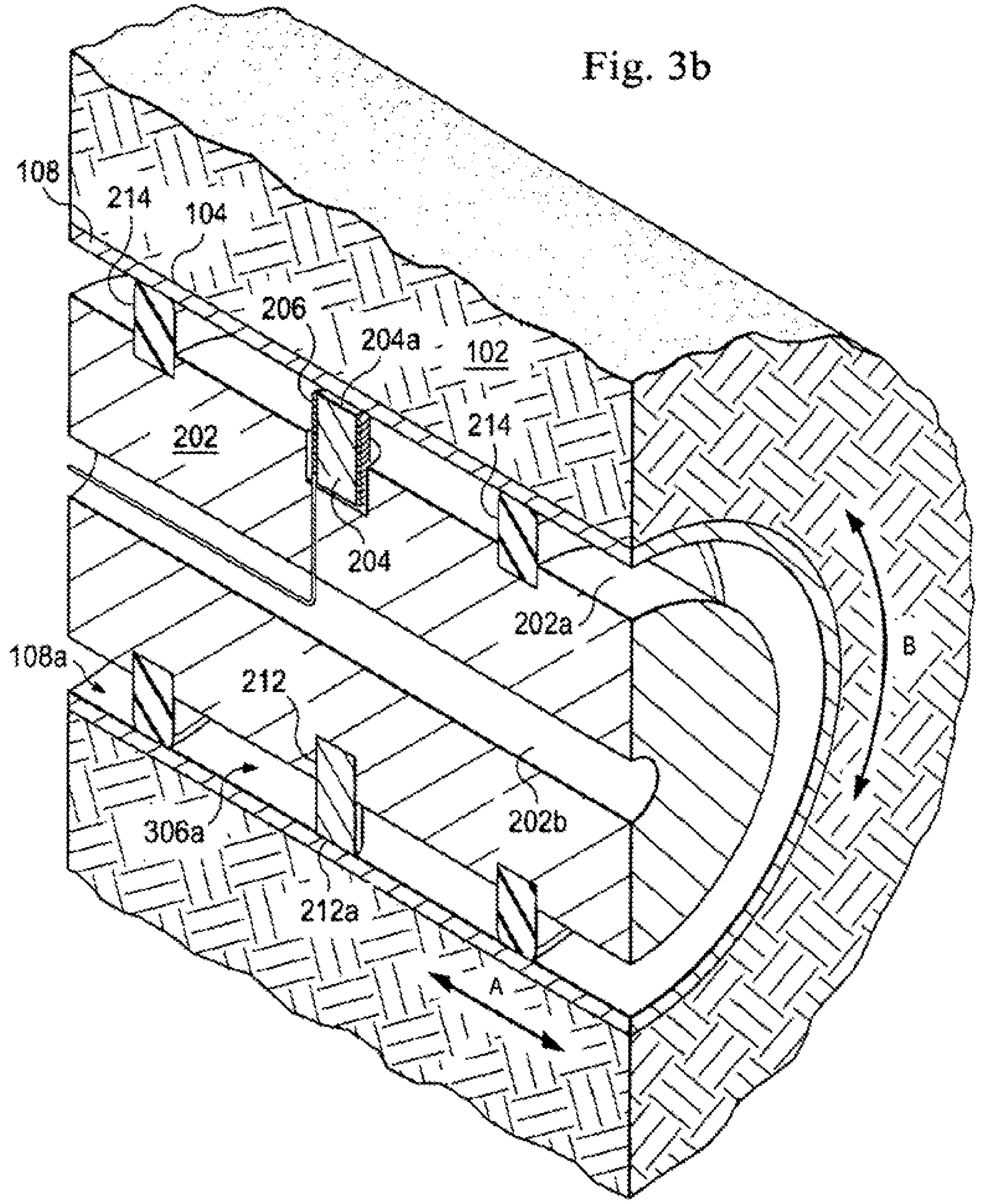
FIG. 3*b* is a perspective cross-sectional view illustrating an embodiment of the electromagnetic perforation device of FIGS. 2*a*, 2*b*, 2*c*, and 2*d* positioned in the well of FIG. 1.

Referring now to FIGS. 3*a* and 3*b*, a method 300 for perforating a well casing is illustrated. The method 300 begins at block 302 where a well casing is provided. In an embodiment, the well casing 108, described above with reference to FIG. 1, is provided located in the wellbore 104 defined by the formation 102. As noted above, the well casing 108, or at least the portion of the well casing 108 to be bored, is formed using a conductive material. The method 300 then proceeds to block 304 where a coil is positioned adjacent a conductive portion of the well casing. In an embodiment, the tool 110 may include only the electromagnetic perforation device 200, described above with reference to FIGS. 2*a*, 2*b*, 2*c*, and 2*d*, and may be lowered on the string 110*a* from the drill station 106 and into the casing passageway 108*a* that is defined by the well casing 108, as illustrated in FIG. 1. In an embodiment, the tool 110 may include the electromagnetic perforation device 200 and at least one other device known in the art of drilling. With the electromagnetic perforation device 200 positioned in the casing passageway 108*a*, the coil 206 is positioned adjacent the portion of the well casing 108 to be bored.

As will be described in more detail below, the coil core 204 may be fixed relative to mandrel 202 or mounted so as to move relative to mandrel 202, such as, for example, by radial extension from mandrel 202, thereby permitting coil 206 to be finely positioned adjacent the casing 108.

The method 300 then proceeds to block 306 where a sealed volume that includes the coil is provided and that sealed volume is evacuated of fluids. With the electromagnetic perforation device 200 located in the casing passageway 108*a*, the sealing member actuator 216 is activated to cause the sealing members 214 to engage the well casing 108, as illustrated in FIG. 3*b*, in order to provide a sealed volume 306*a* that is located between the sealing members 214, the outer surface 202*a* of the mandrel 202, and the well casing 108, and that houses the coil 206. The fluid evacuator 218 is then activated to evacuate fluid from the sealed volume 306*a*. The method 300 then proceeds to block 308 where the position of the coil relative to the easing 108 is stabilized. The stabilizing member 212 is engaged with the well casing 108. In an embodiment, the engagement of the stabilizing member 212 and/or the sealing members 214 with the well casing 108 holds the coil 206 and/or the distil end 204*a* of the coil core 204 adjacent to and spaced apart from the well casing 108. In an embodiment, the coil 206 and/or the distal end 204*a* of the coil core 204 are held a distance from the well casing 108 that is on the order of millimeters. In an embodiment, the distance between the coil 206 and/or the distal end 204*a* of the coil core 204 from the well casing 108 is less than 1 millimeter. In an embodiment, the sensors 220 may be used to determine the relative position of the mandrel 202 and/or the coil 206 with respect to the well casing 108 in order to properly position the coil 206 relative to the well casing 108. In an embodiment, the stabilizing member 212 will counteract any force that attempts to move the coil 206 away from the well casing 108 during actuation of device 200.

Referring now to FIGS. 3*a*, 3*c*, 3*d*, and 4, the method 300 then proceeds to block 310 where a current is provided to the coil to perforate the well casing. In an embodiment, the power supply 210 is used to power the current supply device 208, and the current supply device 208 is actuated to rapidly provide a current to the coil 206. In one example, the current supply device 208 may be a capacitor bank, and the power supply 210 may be used to charge the capacitor bank, which is then actuated to rapidly discharge through the coil 206 by triggering a switch such as, for examples, an ignitron or a spark gap. Preferably, in an embodiment, the current supply device 208 rapidly discharges as is well known in the art. In another example, short current pulses can be generated by a bank of capacitor and avalanche transistor sets connected in series. In such a system, the capacitors may be fully charged. A trigger signal is then sent to the first stage transistor to make it avalanche, and the discharging circuit of the first stage capacitor will be connected. The discharge of the capacitor will generate a short pulse. The voltage of the pulse will be proportional to the voltage charged on the capacitor, and the time duration of the pulse or the pulse width will be determined by the properties of the transistor and the related resistors. The pulse width may be adjusted to picoseconds, nanoseconds, or microseconds by selecting different types of avalanche transistors and related resistors. The short pulse from the first stage transistor will then trigger the second stage transistor and cause it to avalanche and make the second stage capacitor discharge, generating the second stage short pulse. The width of the second stage pulse will be almost the same as that of the first stage pulse if the same type of transistor is used, but the resulting voltage will be the sum of the two stages. The second stage pulse will then trigger the third stage, the third stage will trigger the forth stage, and so on. As such, the stages may be chosen in order to generate a voltage of a desired value. In another embodiment, a direct source of high current may be provided, to the coil 206 from the drill station 106. In an embodiment, the current is greater than 200 amps.

Figure 3C:
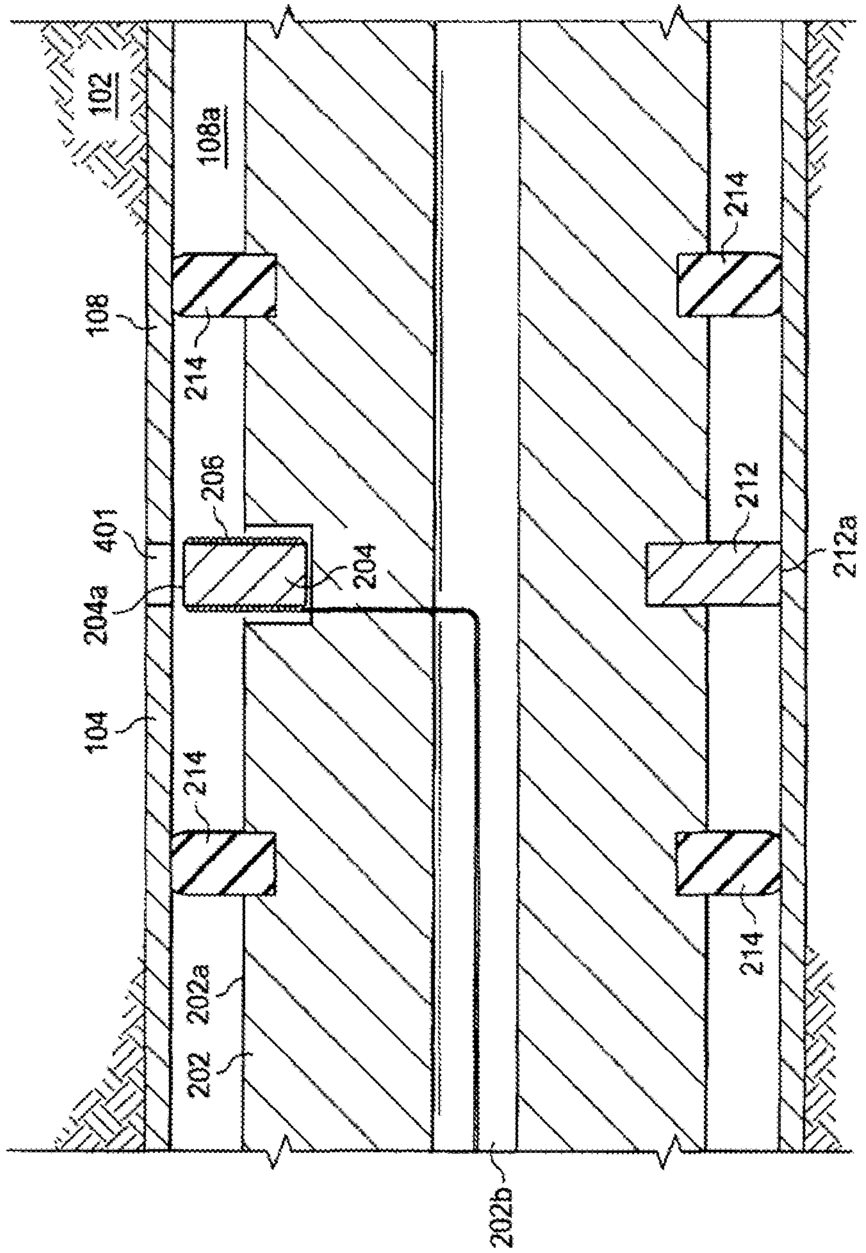
FIG. 3*c* is a cross-sectional view illustrating an embodiment of the electromagnetic perforation device of FIGS. 2*a*, 2*b*, 2*c*, and 2*d* positioned in the well of FIG. 1 after perforating a well casing.
Figure 3D:
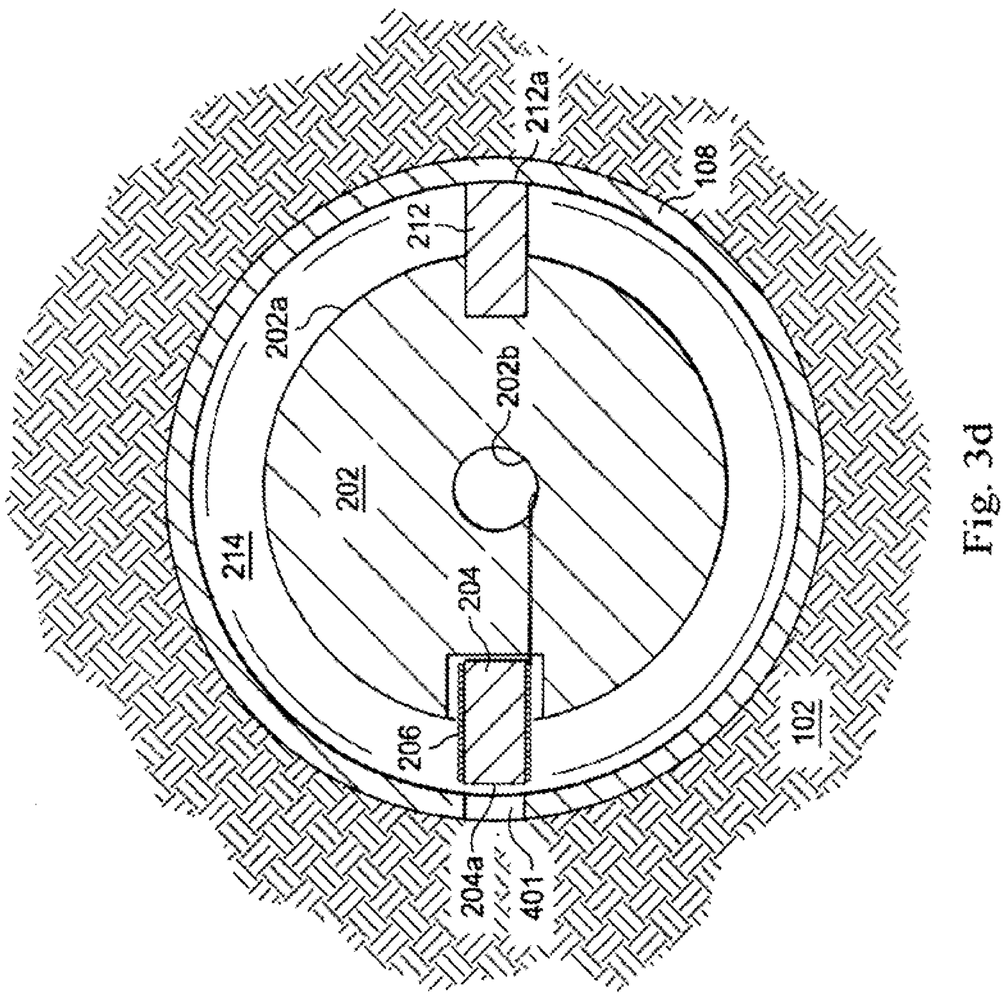
FIG. 3*d* is a cross-sectional view illustrating an embodiment of the electromagnetic perforation device of FIGS. 2*a*, 2*b*, 2*c*, and 2*d* positioned in the well of FIG. 1 after perforating a well casing.
Figure 4:
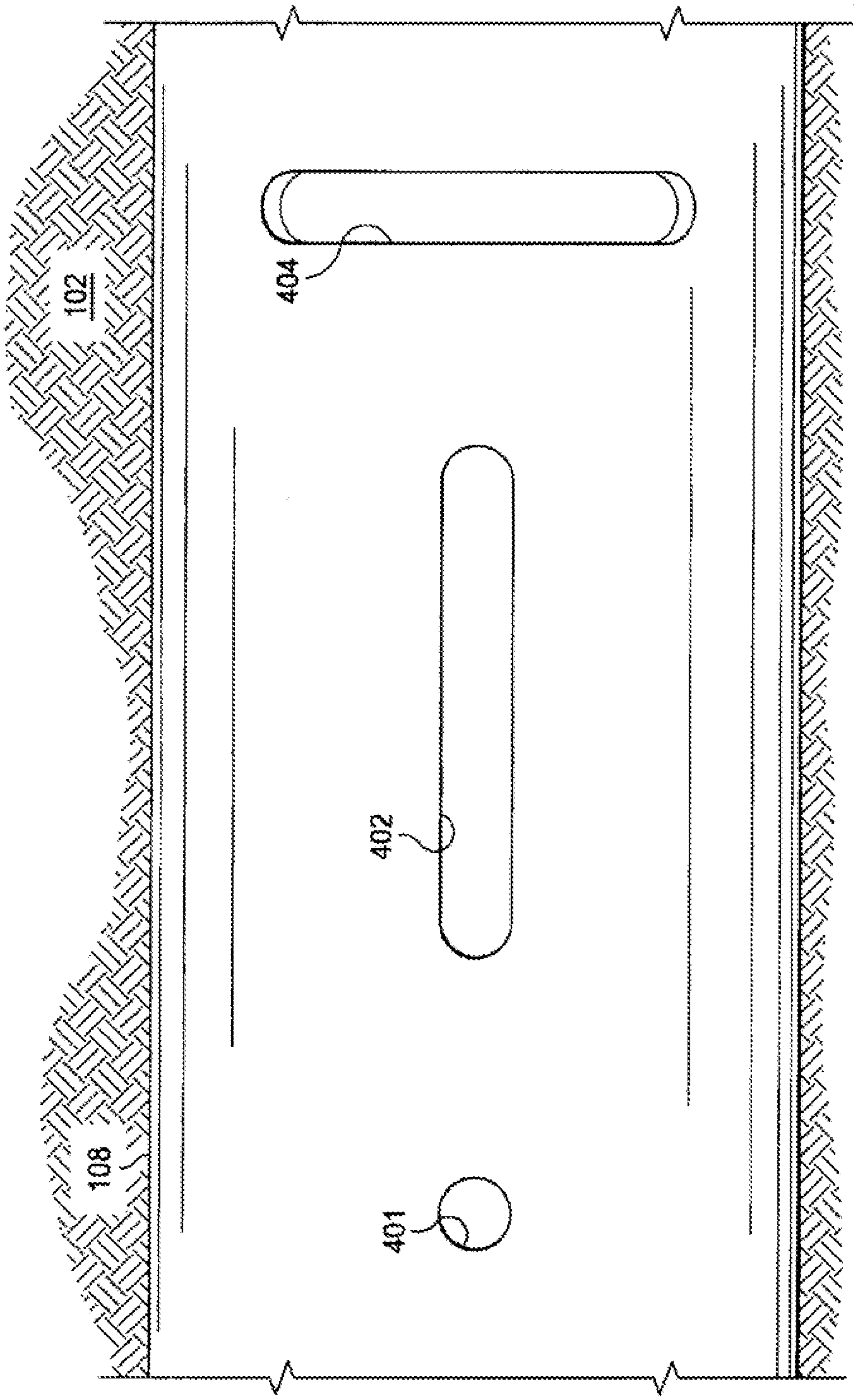
FIG. 4 is a front view illustrating an embodiment of a well casing perforated with a hole, a longitudinal slot, and a circumferential slot using the electromagnetic perforation device of FIGS. 2*a*, 2*b*, 2*c*, and 2*d*.

Rapid discharge of the current through the coil 206 creates a electromagnetic field in coil 206 and simultaneously induces an eddy current in the well casing 108 due to the conductivity of the well casing 108. The eddy current creates a magnetic field in the well casing 108. Pursuant to Lenz's Law, the electromagnetic field from, the coil 206 and the magnetic field in the well casing 108 will strongly repel each other. Since stabilizing member 212 prevents movement of the coil 206 away from the well casing 108, the force from these opposing electromagnetic fields is directed against the well casing 108 away from the coil 206. In art embodiment, this force is sufficient to overcome the yield strength of the well casing 108 to create a perforation 410 in the well casing 108, thereby creating a perforation 401 in the well casing, as illustrated in FIGS. 3*c*, 3*d*, and 4. In an embodiment, the rapid current discharge through the coil 206 may be repeated a plurality of times to overcome the yield strength of the well casing 108 and create the perforation 401. In an embodiment, the rapid current discharge through the coil 206 may be repeated at a frequency that is chosen to match the intrinsic frequency of the material from which the well casing 108 is fabricated in order to overcome the yield strength of the well casing 108 and create the perforation 401. In an embodiment, the creation of the perforation 401 causes the portion of material from the well casing 108 to which the force is applied to separate from the well casing 108, penetrate the cement that holds the well casing 108 in the wellbore 104, and enter the formation 102 such that connectivity between the casing passageway 108*a* and the formation 102 is provided and oil or gas may be removed from the formation as is well known in the art. In an embodiment, ferrites, sleeves, and/or other materials and structures may be used to focus the electromagnetic field generated by the coil 206 to control the direction of the perforation 401 or to provide a desired perforation pattern. In an embodiment, different magnetic field shapes may be used based on the material from which the well casing is fabricated from. Thus, a device 200 has been described that may be operated to perforate a well casing without the dangers associated with conventional explosive techniques. The device 200 is operable more quickly than conventional laser cutting techniques known in the art and does not result in the burrs or other imperfections that are produced in conventional metal cutting techniques.

Figure 3E:
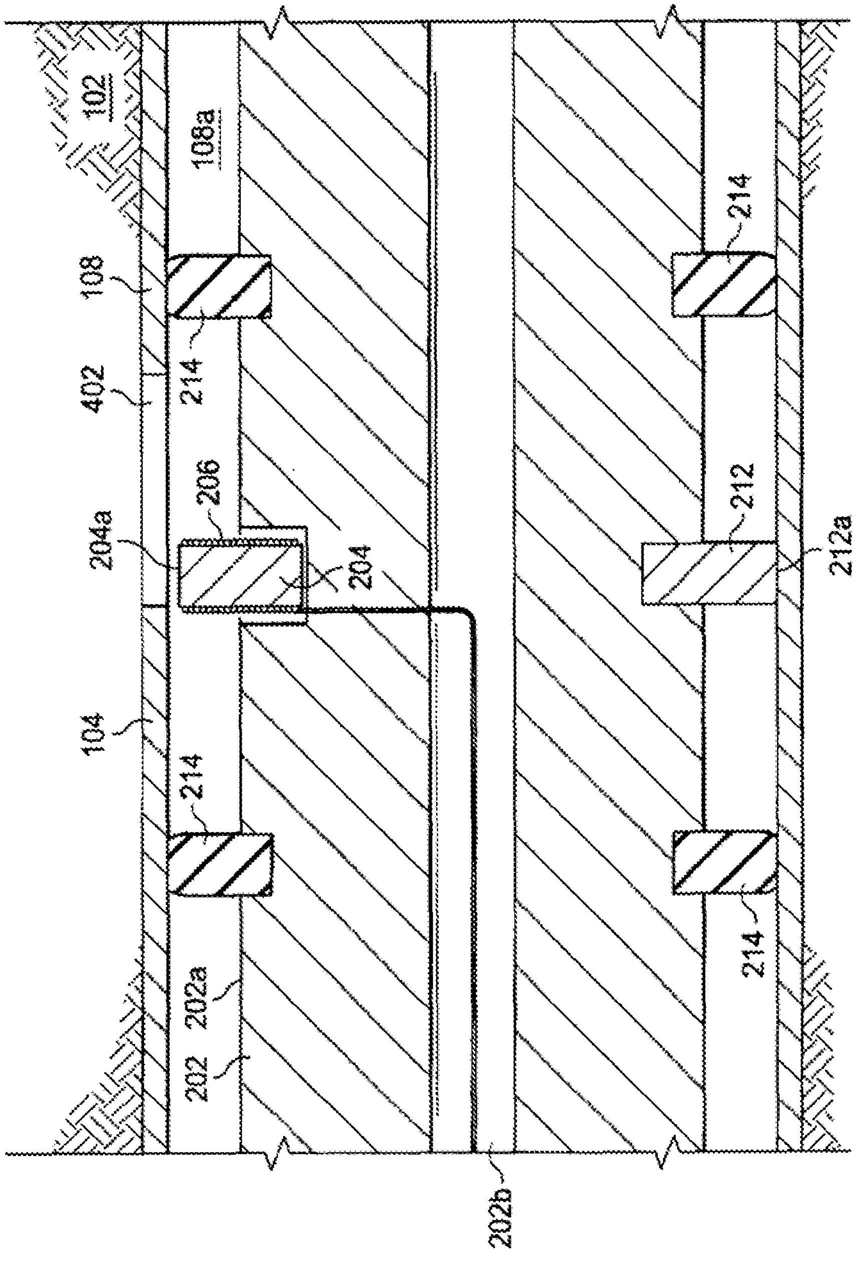
FIG. 3*e* is a cross-sectional view illustrating an embodiment of the electromagnetic perforation device of FIGS. 2*a*, 2*b*, 2*c*, and 2*d* positioned in the well of FIG. 1 after perforating a longitudinal slot in the well casing.
Figure 3F:
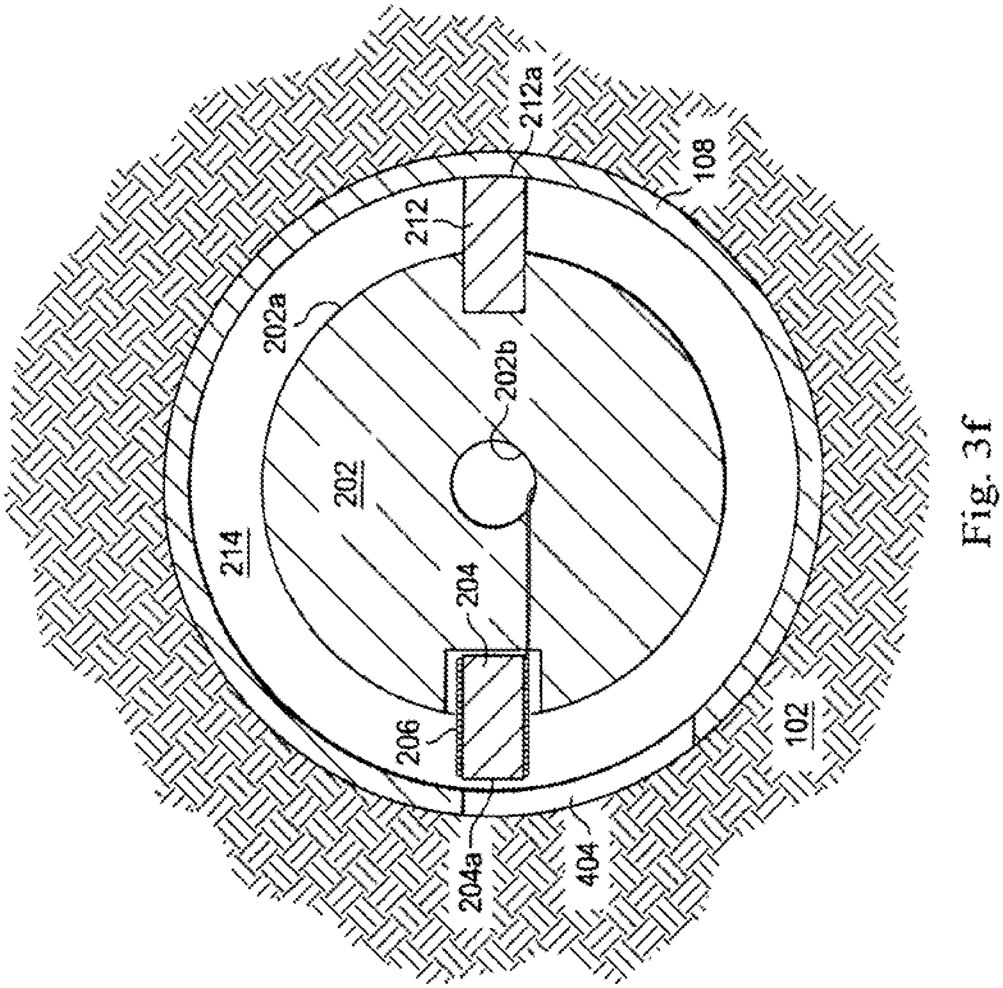
FIG. 3*f* is a cross-sectional view illustrating an embodiment of the electromagnetic perforation device of FIGS. 2*a*, 2*b*, 2*c*, and 2*d* positioned in the well of FIG. 1 after perforating a circumferential slot in the well casing.

Referring now to FIGS. 3*c*, 3*f*, and 4, the block 310 of the method 300 may be modified to create a slot in the well casing 108. In an embodiment, the mandrel 202 may be moved along a direction A, illustrated in FIG. 3*b*, during and/or between the rapid discharge of current from the current discharge device 208 to the coil 206 in order to create a perforation 402 in the well casing 108 that has the shape of a longitudinal slot, as illustrated in FIGS. 3*e* and 4. In another embodiment, the mandrel 202 may be rotated along an arc B, illustrated in FIG. 3*b*, during and/or between the rapid discharge of current from the current discharge device 208 to the coil 206 in order to create a perforation 404 in the well casing 108 that has the shape of a circumferential slot, as illustrated in FIGS. 3*f* and 4. One of skill in the art will recognize that a plurality of perforations, whether holes, slots, and other cut-outs, may be created in the well casing 108 that have different shapes and orientations by moving the mandrel 202 in combinations of the directions discussed above. Alternatively, core 204 itself may be shaped to form such perforations. For example, core 204 may be elongated or partially ring shaped.

Figure 5:
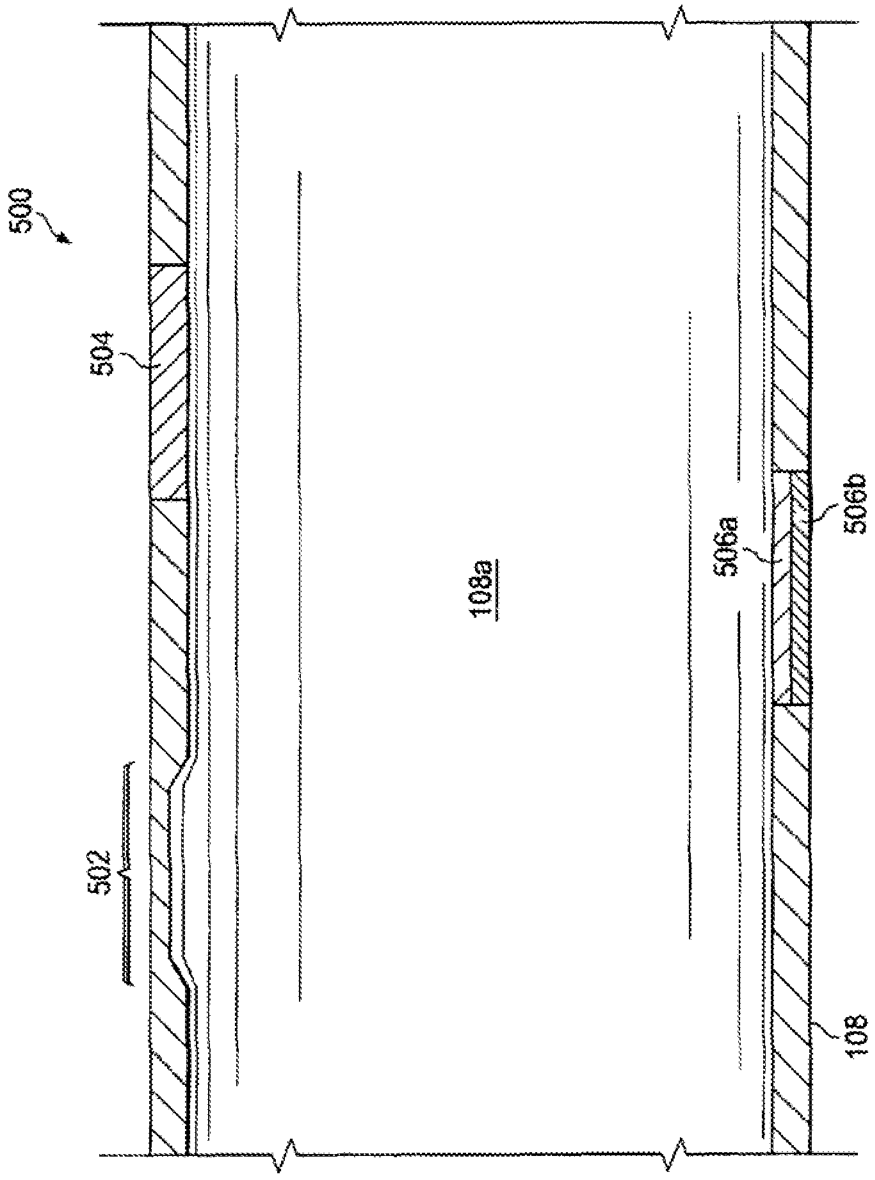
FIG. 5 is a cross-sectional view illustrating an embodiment of a well casing used with the well of FIG. 1 and the electromagnetic perforation device of FIGS. 2*a*, 2*b*, 2*c*, and 2*d*.

Referring now to FIG. 5, a well casing 500 is illustrated that is substantially similar in structure and operation to the well casing 108 described above with reference to FIG. 1, with the provision of a plurality of perforating sections 502, 504, and 506*a* and 506*b* that allow the electromagnetic perforation device 200 to create perforations in the well casing 500 using the method 300 discussed above. In an embodiment, the perforation section 502 includes a section of the wall of well casing 500 that is thinner than the remainder of the well casing 500 and thus requires less force to create the perforation in the well casing 500 using the electromagnetic perforation device 200. In an embodiment, the perforation section 504 includes a section of the wall of the well casing 500 that is fabricated from a different material than majority of the well casing 500, the material in section 504 being chosen because it is more susceptible to the generation of larger eddy currents than the majority of the well easing 108 and/or requires less force to create the perforation in the well casing 500 using the electromagnetic perforation device 200. In an embodiment, the perforation section 506 includes a section of the wall of the well casing 500 that is fabricated from a plurality of different materials, at least one of those materials being different than the majority of the well casing 500, and those materials are chosen because at least one of them are more susceptible to the generation of larger eddy currents than the majority of the well casing 108 and/or require less force to create the perforation in the well casing 500 using the electromagnetic perforation device 200. Thus, the well casing 108 may be constructed to allow the method 300 to be used to more easily utilize the device 200 to perforate a well casing.

Figure 6A:
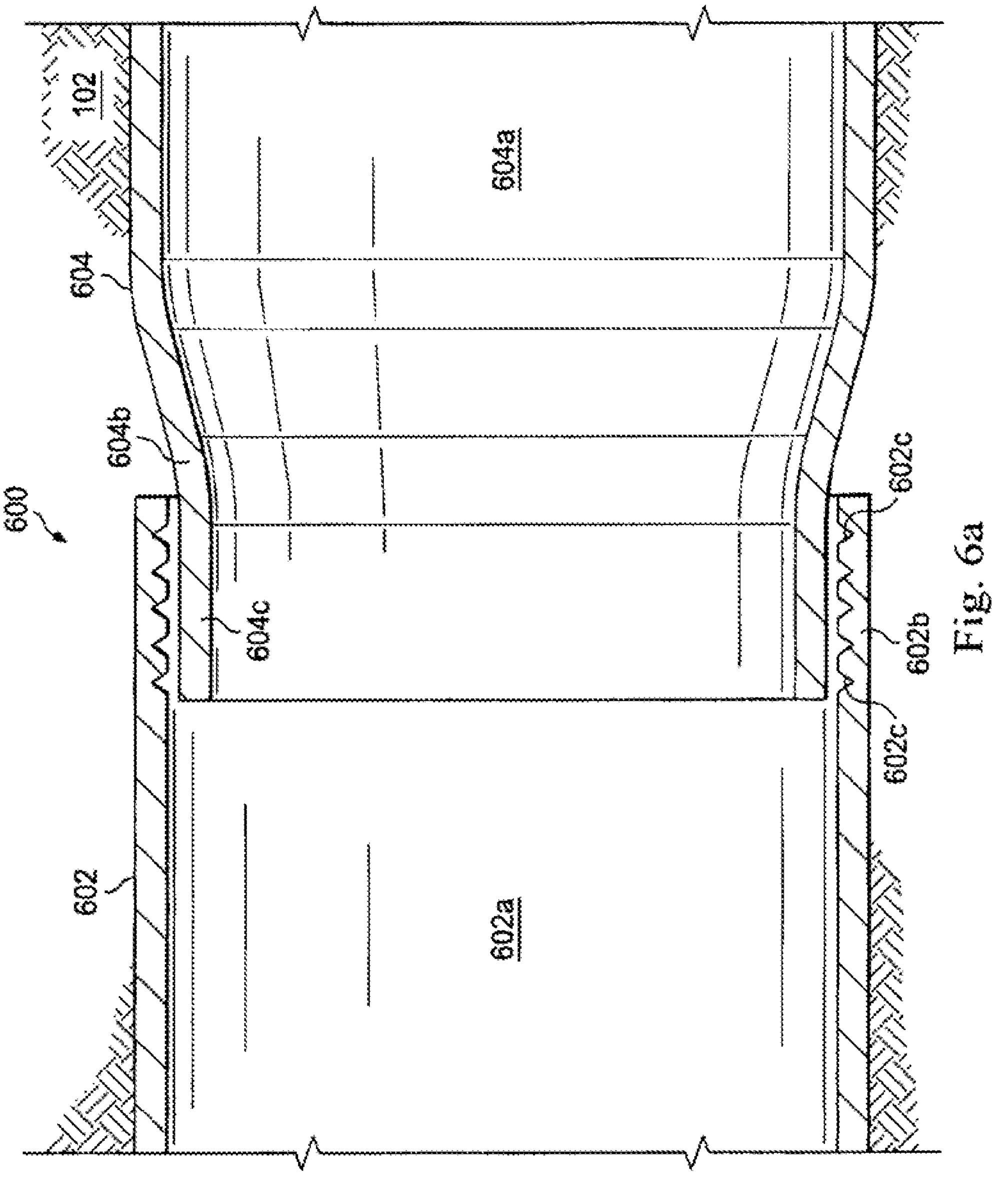
FIG. 6*a* is a cross-sectional view illustrating an embodiment of a well casing used in the well of FIG. 1.
Figure 6B:
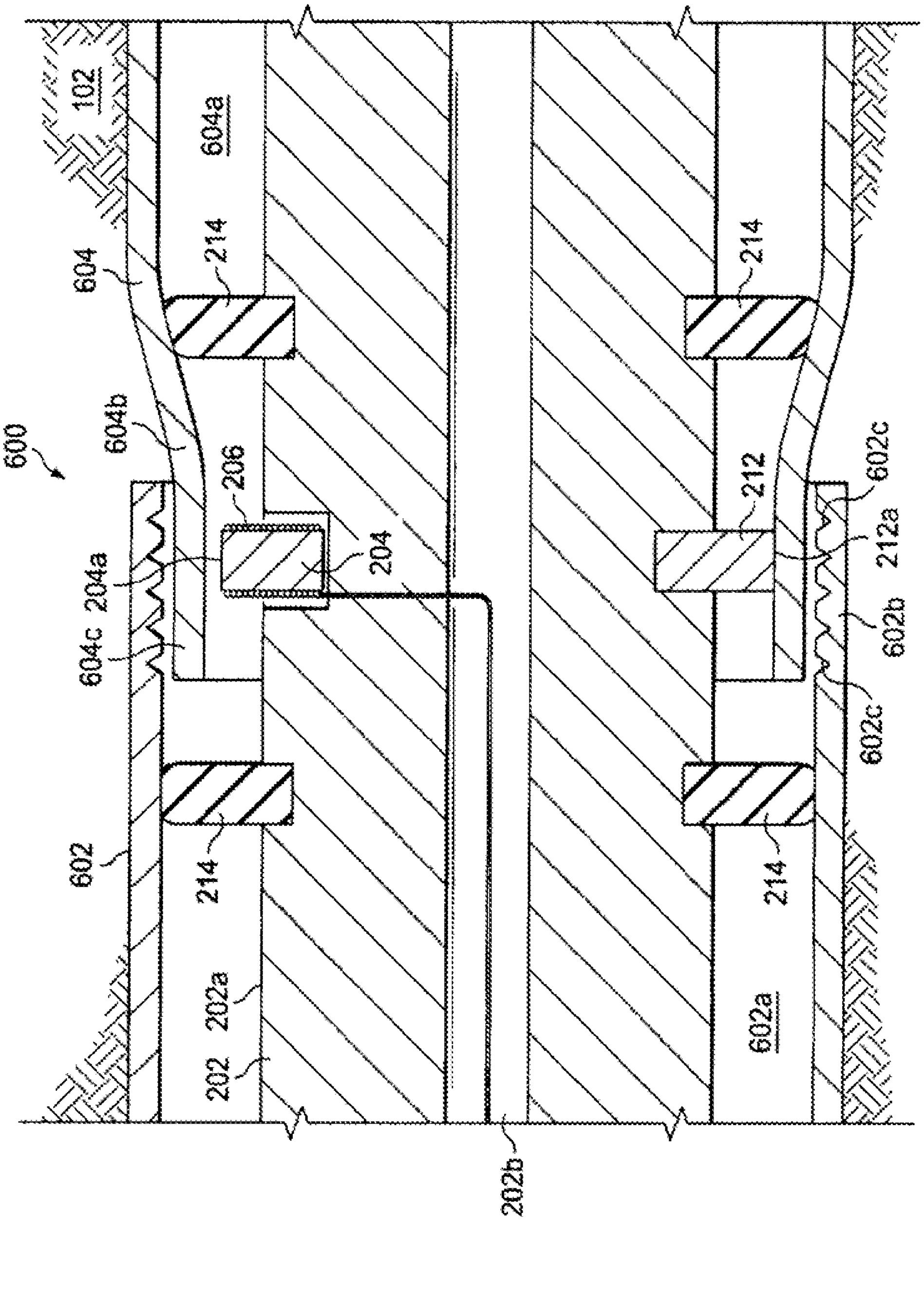
FIG. 6*b* is a cross-sectional view illustrating an embodiment of the electromagnetic perforation device of FIGS. 2*a*, 2*b*, 2*c*, and 2*d* positioned for welding in the well casing of FIG. 6*a*.
Figure 6C:
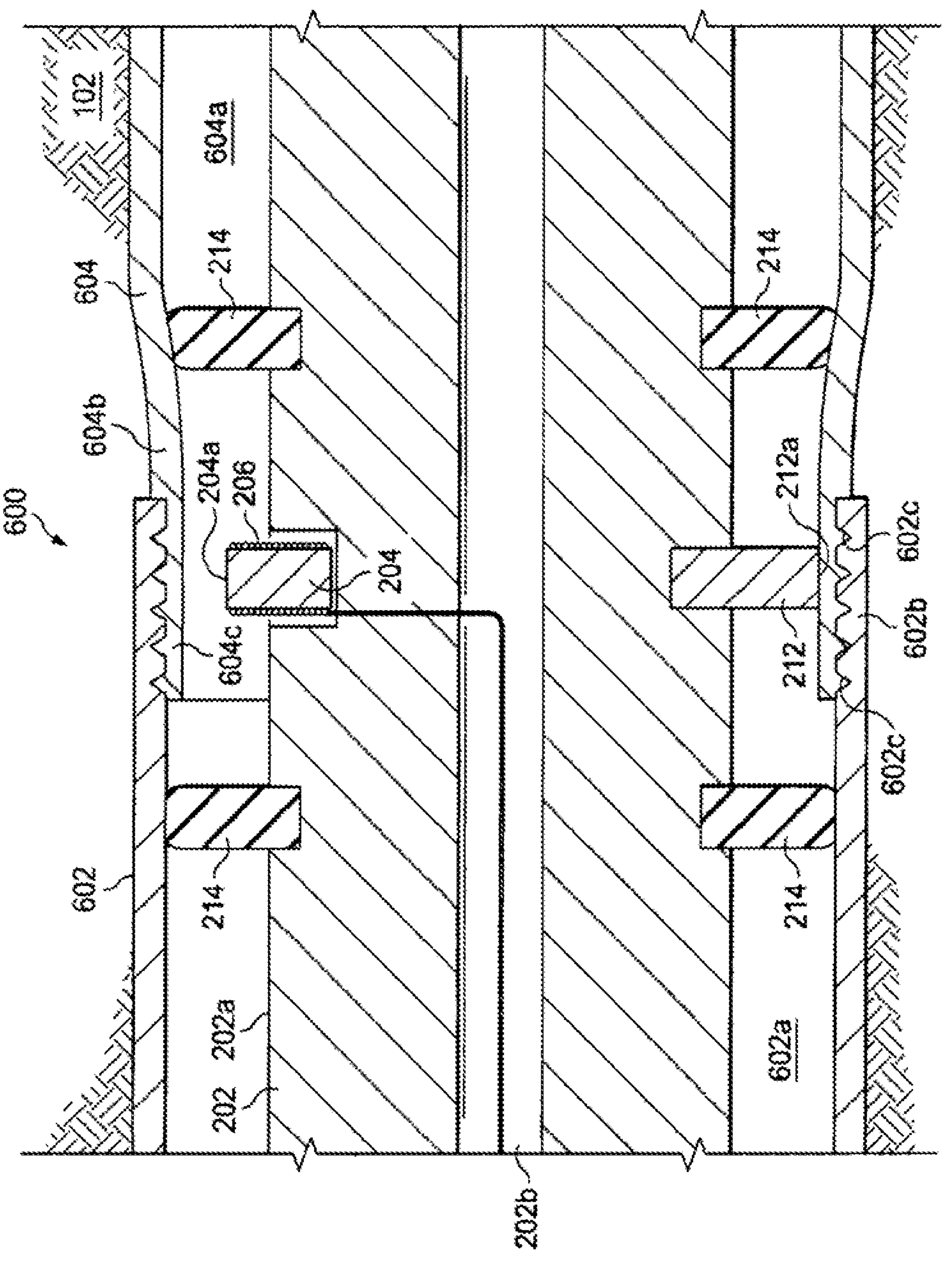
FIG. 6*c* is a cross-sectional view illustrating an embodiment of the electromagnetic perforation device of FIGS. 2*a*, 2*b*, 2*c*, and 2*d* joining sections of the well casing of FIG. 6*a*.

Referring now to FIG. 6*a*, a well casing 600 that may be used with the electromagnetic perforation device 200 is illustrated. The well casing 600 includes at least two casing sections 602 and 604. The casing section 602 defines a easing passageway 602*a* and includes a coupling portion 602*b*. Coupling portion 602*b* may be configured for joining as will be described herein. For example, coupling portion 602*b* may define a plurality of coupling grooves 602*c* on an inner surface of the casing section 602 that is adjacent the casing passageway 602*a*. The casing section 604 defines a casing passageway 604*a* and includes a narrowed portion 604*b* that reduces the casing section 604 in diameter down to a coupling portion 604*c*. Coupling portion 602*b* may be configured for joining, as will be described herein, under application of a joining force. The well casing 600 may be provided in the wellbore 104 defined by the formation 102 as illustrated, with the coupling portion 604*c* of the casing section 604 located in the casing passageway 602*a* of the casing section 602, and an outer surface of the casing section 604*a* located immediately adjacent an inner surface of coupling portion 602*b* of the casing section 602. In an embodiment, the electromagnetic perforation device 200 may be used according to the method 300 with a modified block 310 in order to join the casing section 602 and 604. The method 300 may proceed through blocks 302, 304, 306, and 308 substantially as discussed above such that the electromagnetic perforation device 200 is positioned in the casing passageways 602*a* and 604*a*, with the coil 206 located adjacent the coupling portion 604*c* of the casing section 604 and stabilized in position with the stabilizing member 212, as illustrated in FIG. 6*b*. At block 310, current then may be provided to the coil 206. However, in a modification from block 310 discussed above, the current provided to the coil 206 may be selected not to perforate the well easing 108 as described above, but rather to deform the well casing 600 in order to join the casing sections 602 and 604. As illustrated in FIG. 6*c*, the current supplied to the coil 206 may be chosen such that the force created by the magnetic field interactions deforms the coupling section 604*c* of the casing section 604 into coupling portion 602*b* of the casing section 602. Coupling section 602*c* is then deformed or reshaped by high intensity pulsed magnetic fields that induce a current in section 602*c* and a corresponding repulsive magnetic field in the coil that rapidly repels section 602*c*. In one embodiment, coupling grooves 602*c* enhance such coupling. Those skilled in the art will appreciate that the respective coupling surfaces may be treated with other materials, shaped, or formed of other materials to enhance coupling under application of a force as described herein. Application of the electromagnetic force will cause the respective sections to bond with each other at a molecular or atomic level, thereby forming a "weld" between the sections. One of skill in the art will recognize that, by performing this action about the circumference of the coupling sections 602*b* and 604*c* (e.g., by rotating the mandrel 202 as discussed above), the coupling section 602*b* and the coupling section 604*c* may be joined together. Thus, device 200 functions as an electromagnetic coupling tool in this application. Such a drilling system would comprise a formation defining a wellbore; a first tubular section having a first diameter; a second tubular section having a second diameter smaller than the first diameter, wherein a portion of the second tubular section is disposed within the first tubular section to form a joining zone; a current supply device; a power supply coupled to the current supply device; and an electromagnetic perforation device disposed adjacent the joining zone, said electromagnetic perforation device comprising: a mandrel; a coil core carried by said mandrel, said coil core having a distal end and a proximal end; a coil disposed on the coil core and coupled to said current supply device; wherein the current supply device is operable to supply a current to the coil to created an electromagnetic field therein. At least a portion of said second tubular member forming the joining zone is electrically conductive. Likewise, a method for joining tubular casing sections comprises the steps of providing a first tubular section having a first diameter; providing a second tubular section having a second diameter smaller than the first diameter; disposing a portion of the second tubular section within the first tubular section to form a joining zone; and utilizing an electromagnetic force to join said tubular sections to one another in the joining zone. The method may further include the steps of positioning a coil adjacent the second tubular in the joining zone, wherein the second tubular adjacent the coil is electrically conductive; stabilizing the position of the coil relative to at least one of the tubulars; and applying an electromagnetic force to the second tubular in the joining zone. The method may further include the steps of deforming said second tubular so as to engage with said first tubular in the joining zone.

Figure 7A:
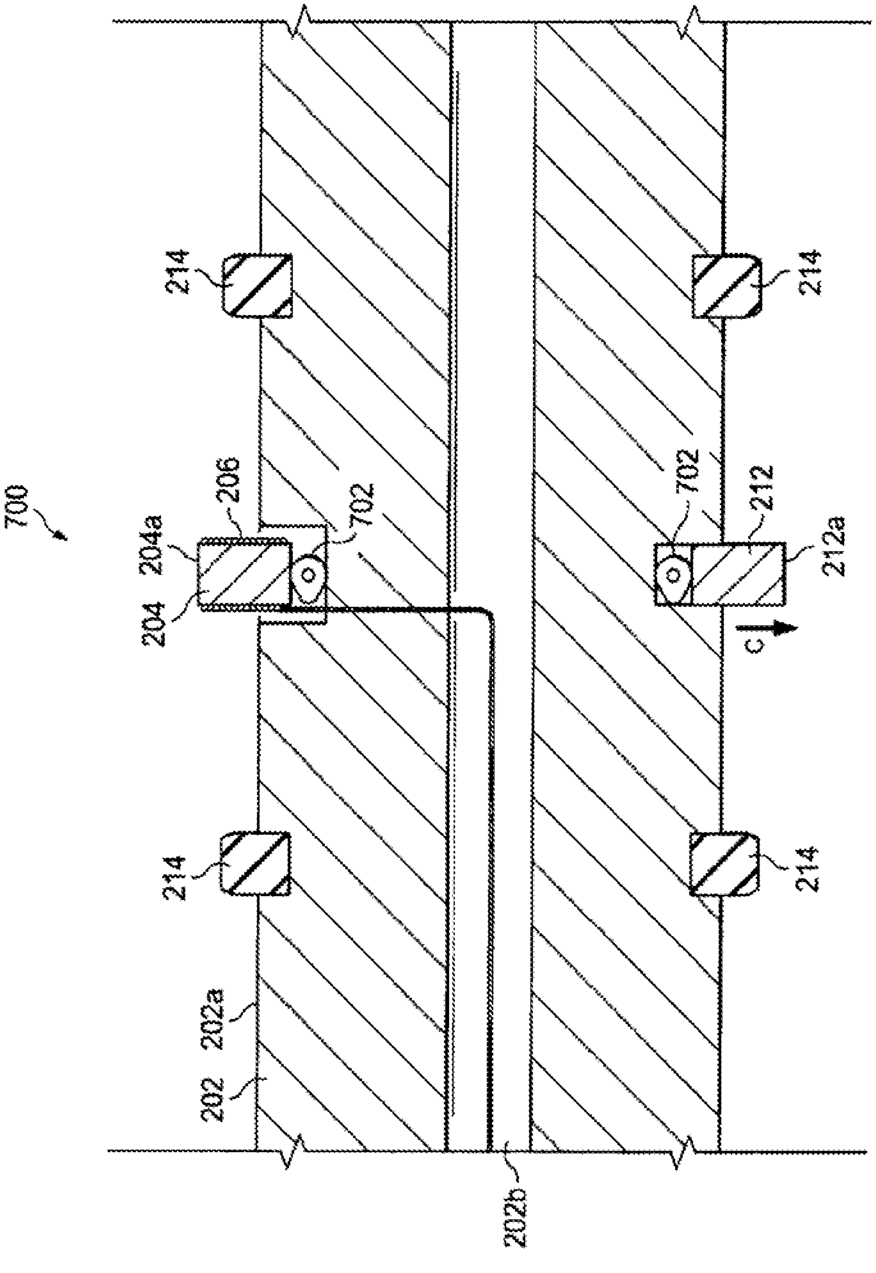
FIG. 7*a* is a cross-sectional view illustrating an embodiment of an electromagnetic perforation device of FIGS. 2*a*, 2*b*, 2*c*, and 2*d* having a moving stabilizing member.
Figure 7B:
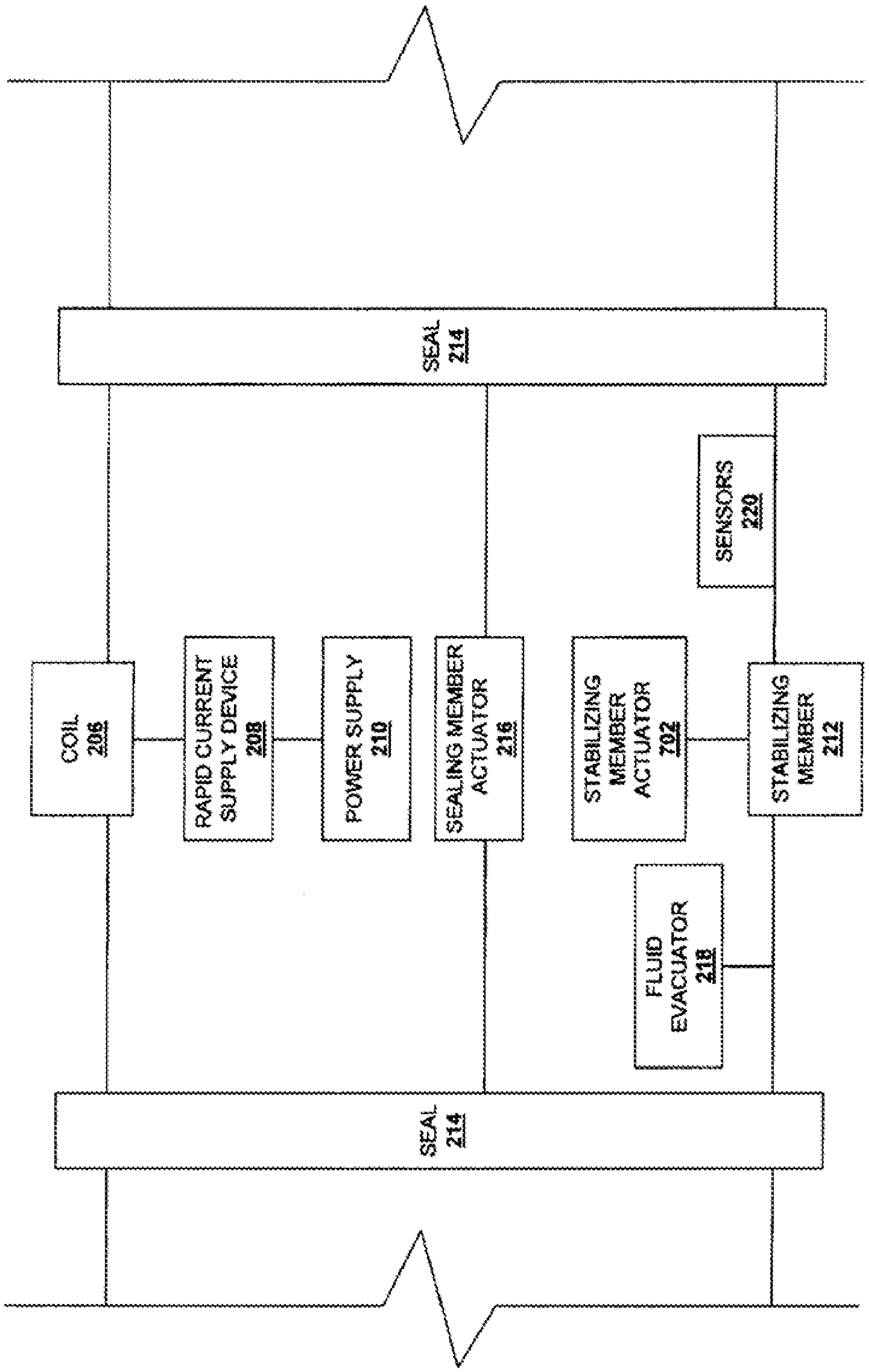
FIG. 7*b* is a schematic view illustrating an embodiment of the electromagnetic perforation device of FIG. 7*a*.
Figure 7C:
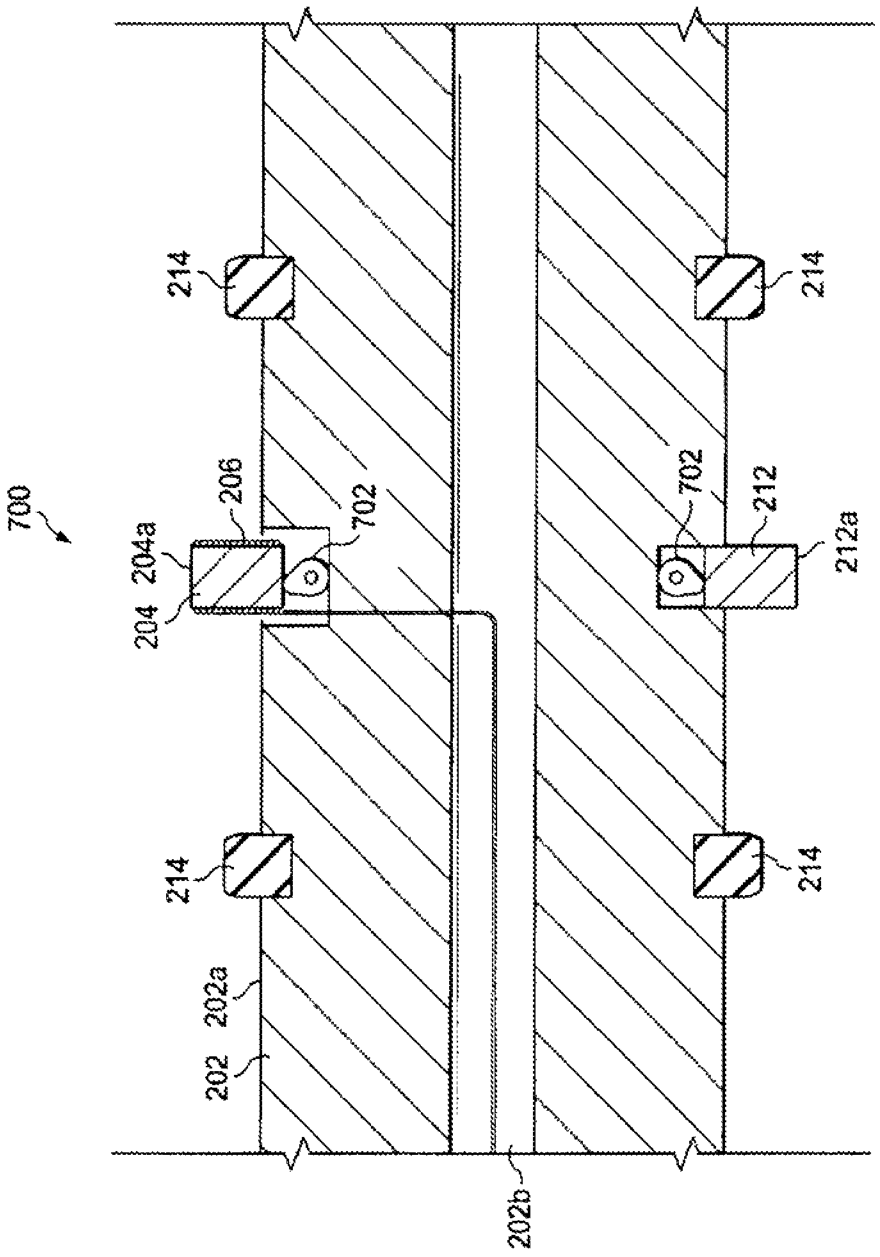
FIG. 7*c* is a cross-sectional view illustrating an embodiment of the electromagnetic perforation device of FIG. 7*a* with the stabilizing member moved.

Referring now to FIGS. 7*a*, 7*b*, and 7*c*, an electromagnetic perforation device 700 is illustrated that is substantially similar in structure and operation to the electromagnetic perforation device 200, described above with reference to FIGS. 2*a*, 2*b*, 2*c*, 2*d*, 3*a*, 3*b*, 3*c*, and 3*d*, with the provision of a moveable stabilizing member 212. In an embodiment, the electromagnetic perforation device 700 includes the stabilizing member 212 moveably coupled to the mandrel 202 and coupled to a stabilizing member actuator 702. In operation, the stabilizing member actuator 702 may be actuated in order to move the stabilizing member 212 in a direction C, illustrated in FIG. 7*a*, such that the stabilizing member 212 is extended from the outer surface 202*a* of the mandrel 202, as illustrated in FIG. 7*c*. Moving the stabilizing member 212 as discussed above may provide a number of benefits such as, for example, the functionality to adjust the position of the coil 206 relative to the well casing 108. While the stabilizing member actuator 702 has been illustrated as a cam member that moves the stabilizing member 212, which was already extending from the outer surface 202*a* of the mandrel 202, to a further extension from the outer surface 202*a* of the mandrel 202, the disclosure is not so limited. Any actuation method may be used to move the stabilizing member 212 relative to the mandrel 202. Furthermore, the stabilizing member 212 may be operable to fully retract into the mandrel 202 such that the stabilizing member 212 is flush with or recessed into the mandrel 202. Furthermore, a similar actuation member may be coupled to the mandrel 202, the coil core 204, and the coil 206 to allow the coil core 204 and coil 206 to be extended further from the outer surface 202*a* of the mandrel 202, retracted into the mandrel 202 such that it is flush, with or recessed into the mandrel 202, and or positioned relative to the mandrel 202 in a variety of other positions. The ability to move the stabilizing member 212 and the coil core 204/coil 206 relative to the mandrel 202 (e.g., flush with or recessed into the mandrel 202) allows the electromagnetic perforation device 700 to be lowered into the casing passageway 108*a* on the well casing 108 without danger of damaging the stabilizing member 212 or coil core 204 and coil 206 on the well casing 108 or other features that could cause damage to the electromagnetic perforation device 700.

Figure 8:
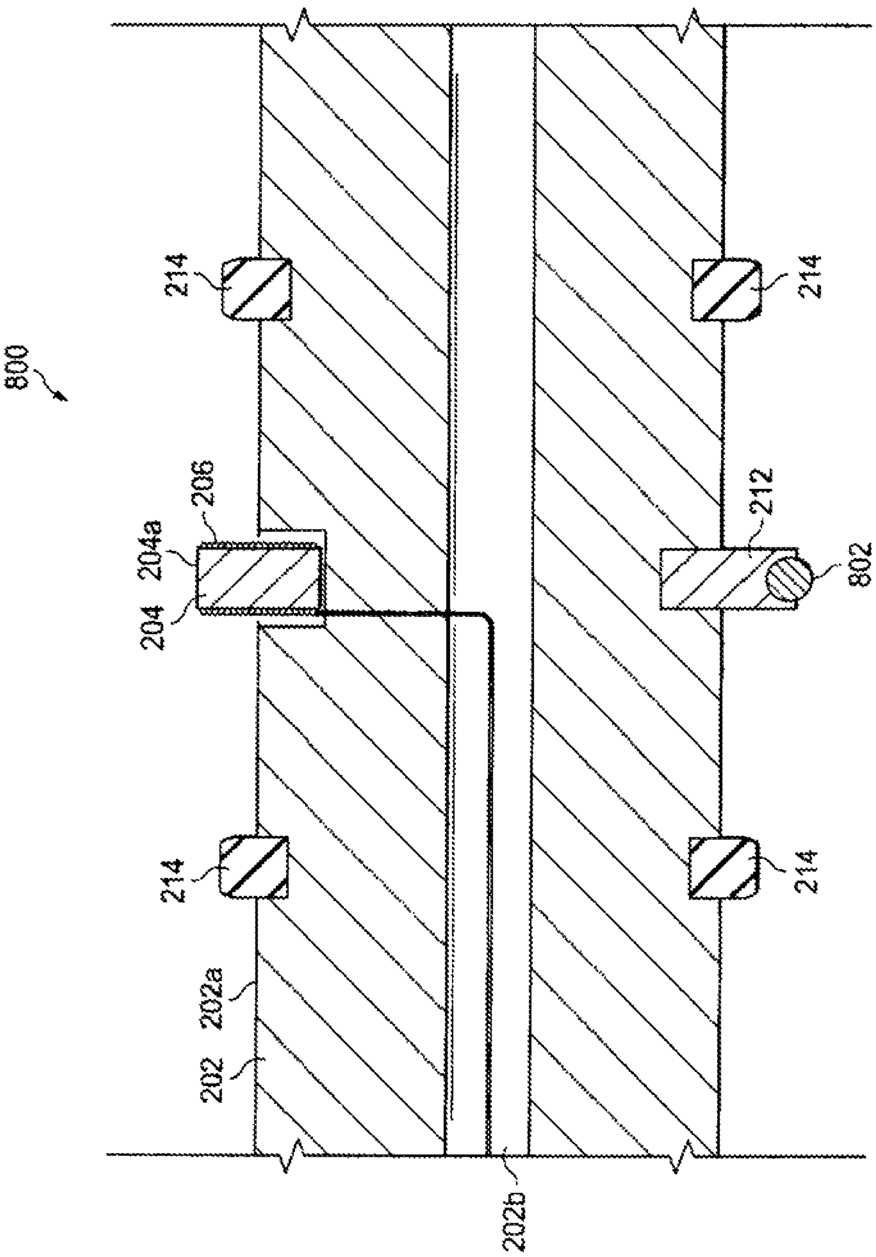
FIG. 8 is a cross-sectional view illustrating an embodiment of an electromagnetic perforation device of FIGS. 2*a*, 2*b*, 2*c*, and 2*d* having a modified stabilizing member.

Referring now to FIG. 8, a electromagnetic perforation device 800 is illustrated that is substantially the same in structure and operation to the electromagnetic perforation device 200, described above with reference to FIGS. 2*a*, 2*b*, 2, 2*d*, 3*a*, 3*b*, 3*c*, and 3*d*, with the provision of a modified stabilizing member 212. In an embodiment, the stabilizing member 212 includes a well casing engagement member 802. In the illustrated embodiment, the well casing engagement member 802 is a ball and socket that is located on the distal end of the stabilizing member 212 and is operable to engage the well casing 108 and allow movement of the electromagnetic perforation device 800 relative to the well casing while still allowing the stabilizing member 212 to stabilize the coil 206 relative to the well casing 108. However, one of skill in the art will recognize that a variety of other structures may be used other than a ball and socket that will provide similar functionality. Furthermore, the well casing engagement member 802 may include a drive system (not illustrated) that drives the well casing engagement member 802 to rotate and, through its engagement with the well casing 108, move the device casing 202 relative to the well casing 108 as discussed above.

Figure 9A:
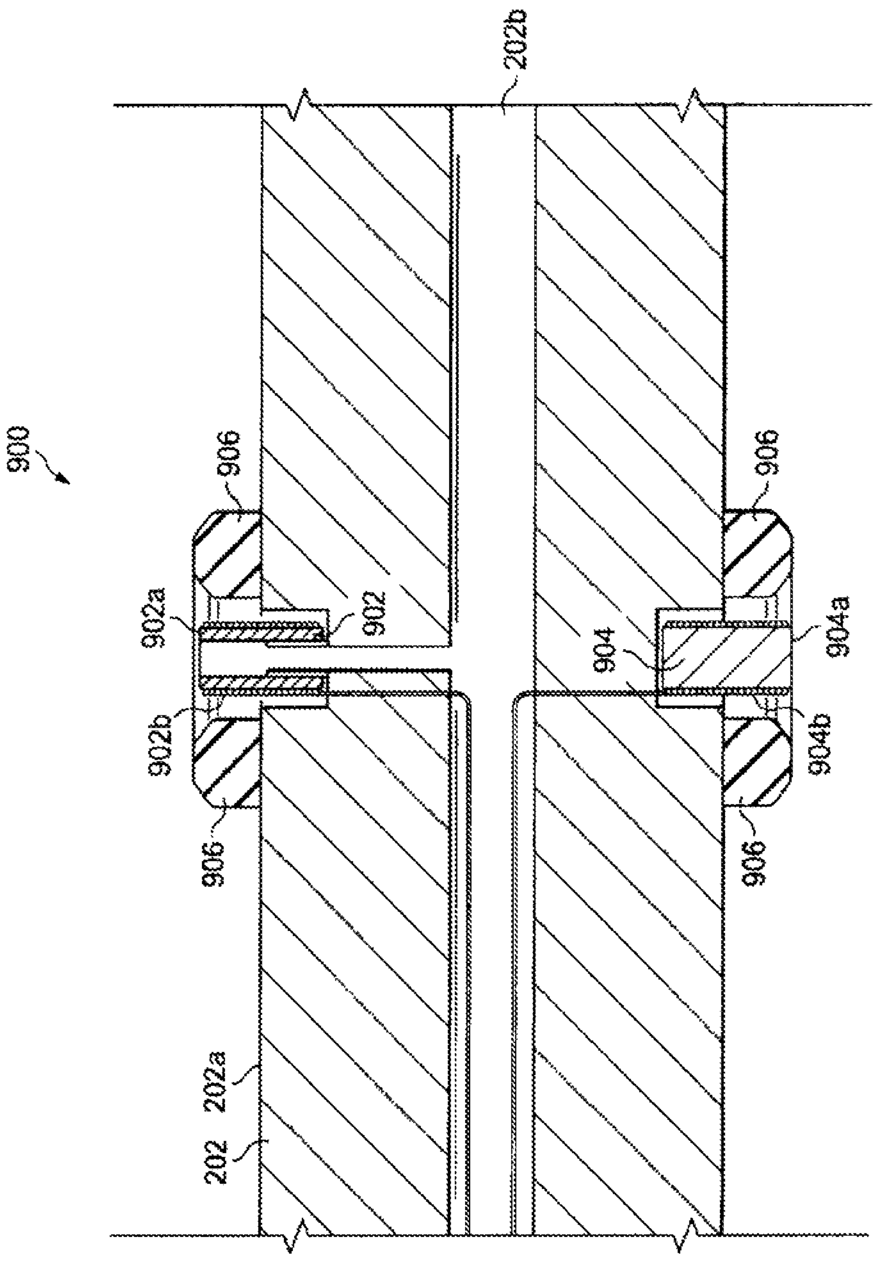
FIG. 9*a* is a perspective view illustrating an embodiment of an electromagnetic perforation device of FIGS. 2*a*, 2*b*, 2*c*, and 2*d* having a snorkel, a stabilizing member with a coil, and circumferential sealing members.
Figure 9B:
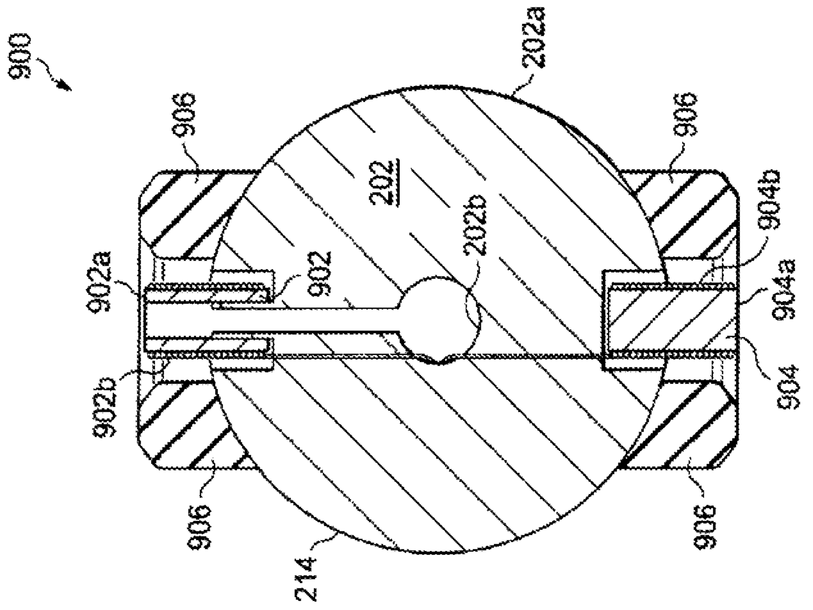
FIG. 9*b* is a cross-sectional view illustrating an embodiment of the electromagnetic perforation device of FIG. 9*a*.
Figure 9C:
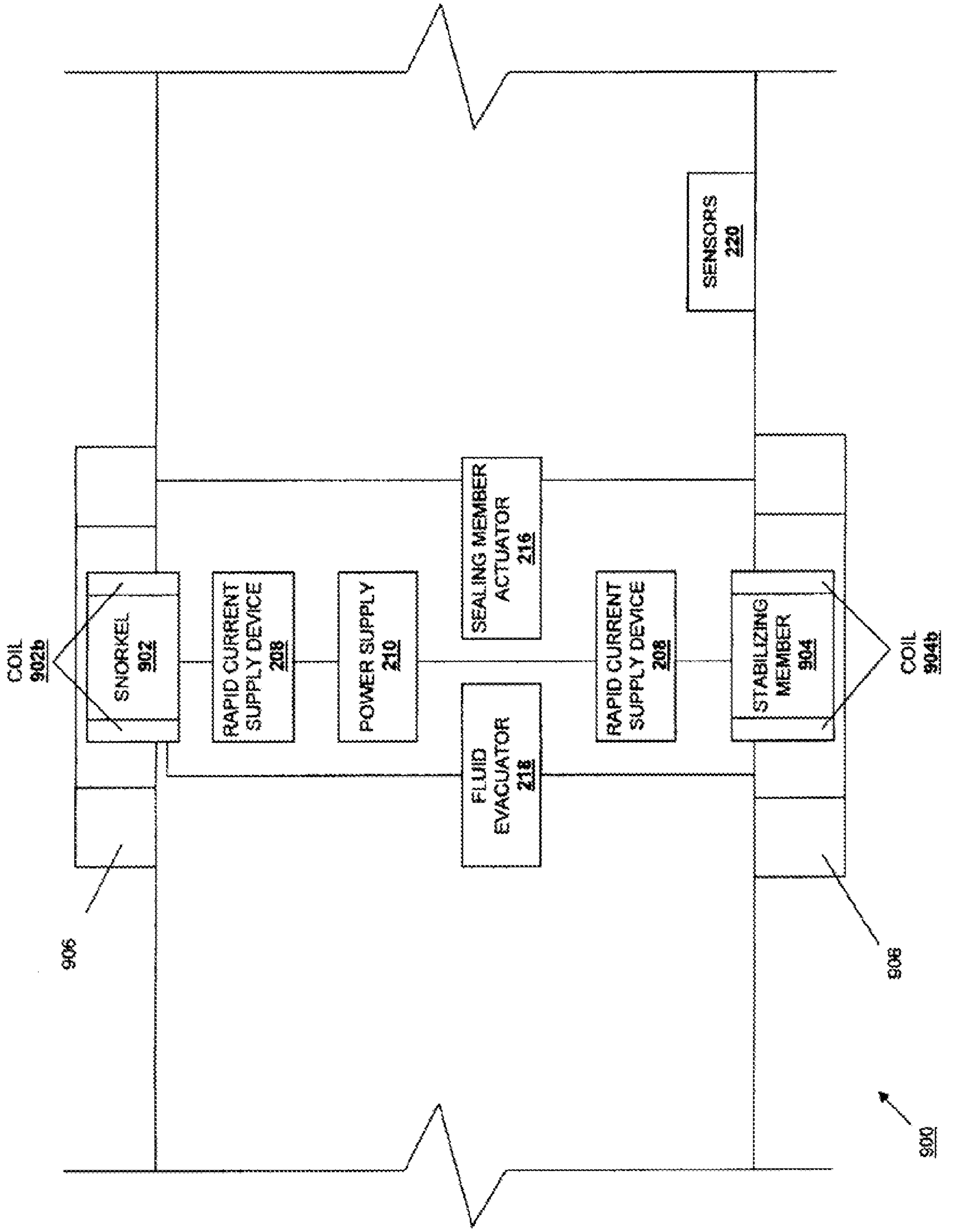
FIG. 9*c* is a schematic view illustrating an embodiment of the electromagnetic perforation device of FIGS. 9*a* and 9*b*.

Referring now to FIGS. 9*a*, 9*b*, and 9*c*, a electromagnetic perforation device 900 is illustrated that is substantially the same in structure and operation to the electromagnetic perforation device 200, described above with reference to FIGS. 2*a*, 2*b*, 2*c*, 2*d*, 3*a*, 3*b*, 3*c*, and 3*d*, with the provision of a modified coil core 902 replacing the coil core 204, a modified stabilizing member 904 replacing the stabilizing member 212, and modified sealing members 206 replacing the sealing members 214. In an embodiment, the coil core 902 is a snorkel that includes a distal end 602*a* and that is operable to move relative to the mandrel 202 such that the distance between the distal end 602*a* and the outer surface 202*a* of the mandrel 202 may be adjusted. A coil 902*b* is located on the coil core 902 and, in the illustrated embodiment, extends along the coil core 902 from the outer surface 202*a* of the mandrel 202 to the distal end 902*a* of the coil core 902. The coil 902*b* is coupled to the current supply device 208. In an embodiment, the coil 902*b* may be substantially similar to the coil 206, described above with reference to FIGS. 2*a*, 2*b*, 2*c*, and 2*d*, and may operable in a substantially similar manner as described above for the coil 206. The stabilizing member 904 includes a distal end 904*a* and, in an embodiment, may be substantially similar to the coil core 204, described above with reference to FIGS. 2*a*, 2*b*, 2*c*, and 2*d*. A coil 904*b* is located on the coil core 904 and, in the illustrated embodiment, extends along the coil core 904 from the outer surface 202*a* of the mandrel 202 to the distal end 904*a* of the coil core 904. The coil 904*b* is coupled to the current supply device 208. In an embodiment, the coil 904*b* may be substantially similar to the coil 206, described above with reference to FIGS. 2*a*, 2*b*, 2*e*, and 2*d*, and may operable in a substantially similar manner as described above for the coil 206. The sealing members 906 surround each coil core 902 and 904 circumferentially. In operation, the sealing member 906 may be activated to engage the casing 108, as discussed above, and the fluid within the circumference of the sealing member 906 may be evacuated using the snorkel 902. The snorkel 902 may then be extended from the mandrel 202 until it engages or is located immediately adjacent the casing 108, and a perforation may be made in the casing 108 as discussed above. The snorkel 902 may the be used to sample fluid in the formation 102. Furthermore, the sealing member 906 adjacent the coil core 904 may operate substantially the same as the sealing member 906 adjacent the snorkel 902, and the current supply device 208 may supply current to each of the coils 902*b* and 904*b* at the same time in order to provide multiple perforations in the well casing. In another embodiment, the current supply device 208 may supply current to the coil 902*b* while the stabilizing member 904 stabilizes the position of the coil 902*b* relative to the well easing 108, as described above, and then the current supply device 208 may supply current to the coil 904*b* while the snorkel 902 stabilizes the position of the coil 904*b* relative to the well casing 108 in a substantially similar manner.

Figure 10:
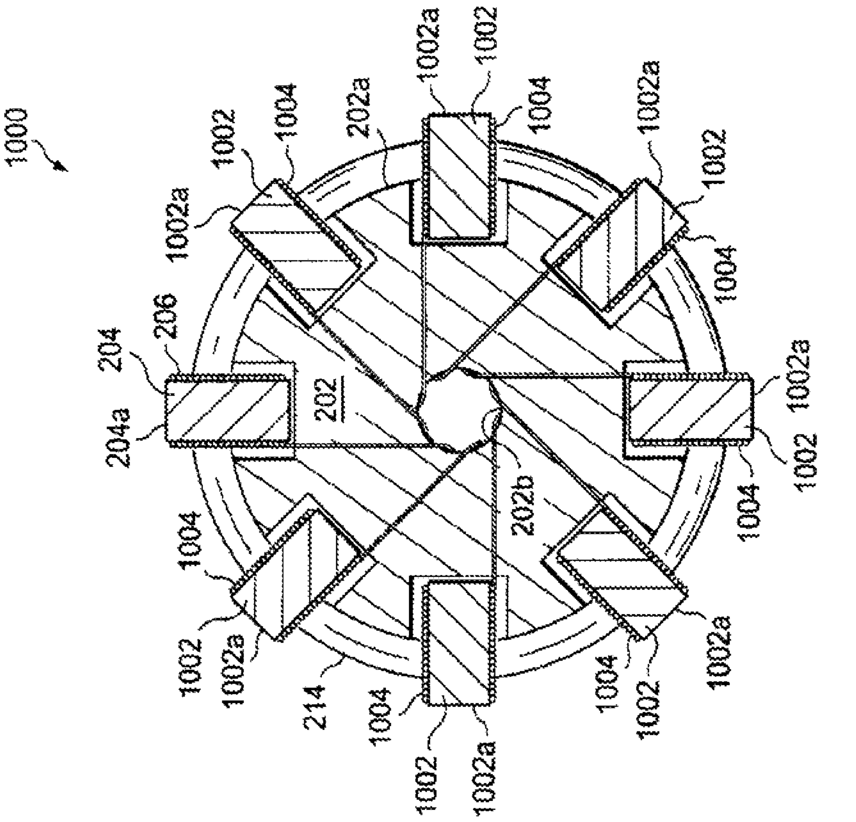
FIG. 10 is a cross-sectional view illustrating an embodiment of the electromagnetic perforation device of FIGS. 2*a*, 2*b*, 2*c*, and 2*d* with a plurality of stabilizing members and coils.

Referring now to FIG. 10, a electromagnetic perforation device 1000 is illustrated that is substantially the same in structure and operation to the electromagnetic perforation device 200, described above with reference to FIGS. 2*a*, 2*b*, 2*c*, 2*d*, 3*a*, 3*b*, 3*c*, and 3*d*, with the provision of plurality of stabilizing members 1002 each having a distal end 1002*a* and each including a coil 1004. While the plurality of stabilizing members 1002 and coils 1004 have been illustrated as spaced apart radially about the circumference of the mandrel 202, one of skill in the art will recognize that a variety of configurations of the plurality of stabilizing members 1002 and coils 1004 may be provided (e.g., spaced apart longitudinally along the mandrel 202) without departing from the scope of the present disclosure. In operation, any of the stabilizing members 1002 (or the coil core 204) may be used to stabilize other coils 206 or 1004 relative to the well casing 108 to perforate the well casing 108. Furthermore, multiple perforations may be created in the well casing 108 by supplying current to multiple coils 206 and/or 1004. Also, each of the stabilizing members 1002 and the coil core 204 may be moveable relative to the mandrel 202, as described above with reference to FIGS. 7*a*, 7*b*, and 7*c*, and may be used to provide fine tuning of the position of any of the coils 206 and 1004.

Figure 11A:
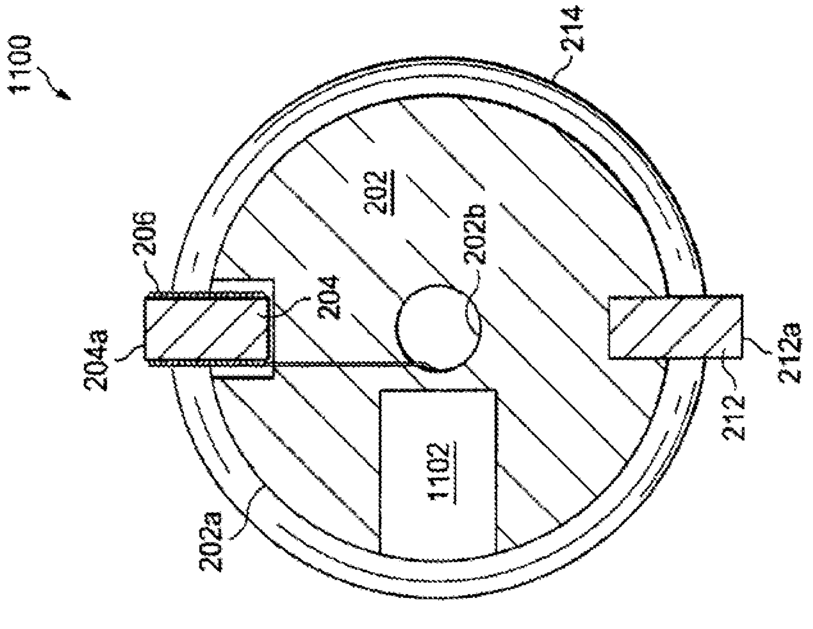
FIG. 11*a* is a cross-sectional view illustrating an embodiment of the electromagnetic perforation device of FIGS. 2*a*, 2*b*, 2*c*, and 2*d* with a radially positioned formation puncturing device.
Figure 11B:
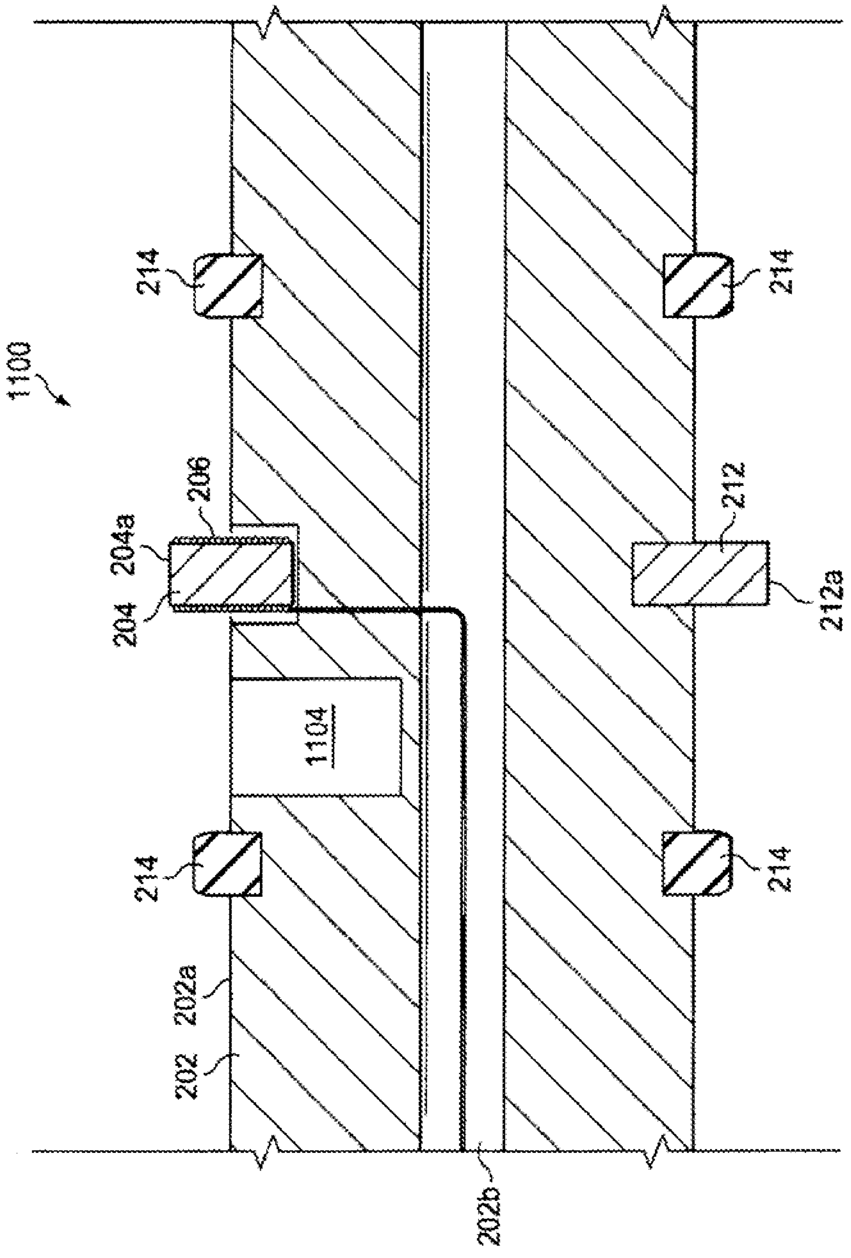
FIG. 11*b* is a cross-sectional view illustrating an embodiment of the electromagnetic perforation device of FIGS. 2*a*, 2*b*, 2*c*, and 2*d* with a longitudinally positioned formation puncturing device.
Figure 11C:
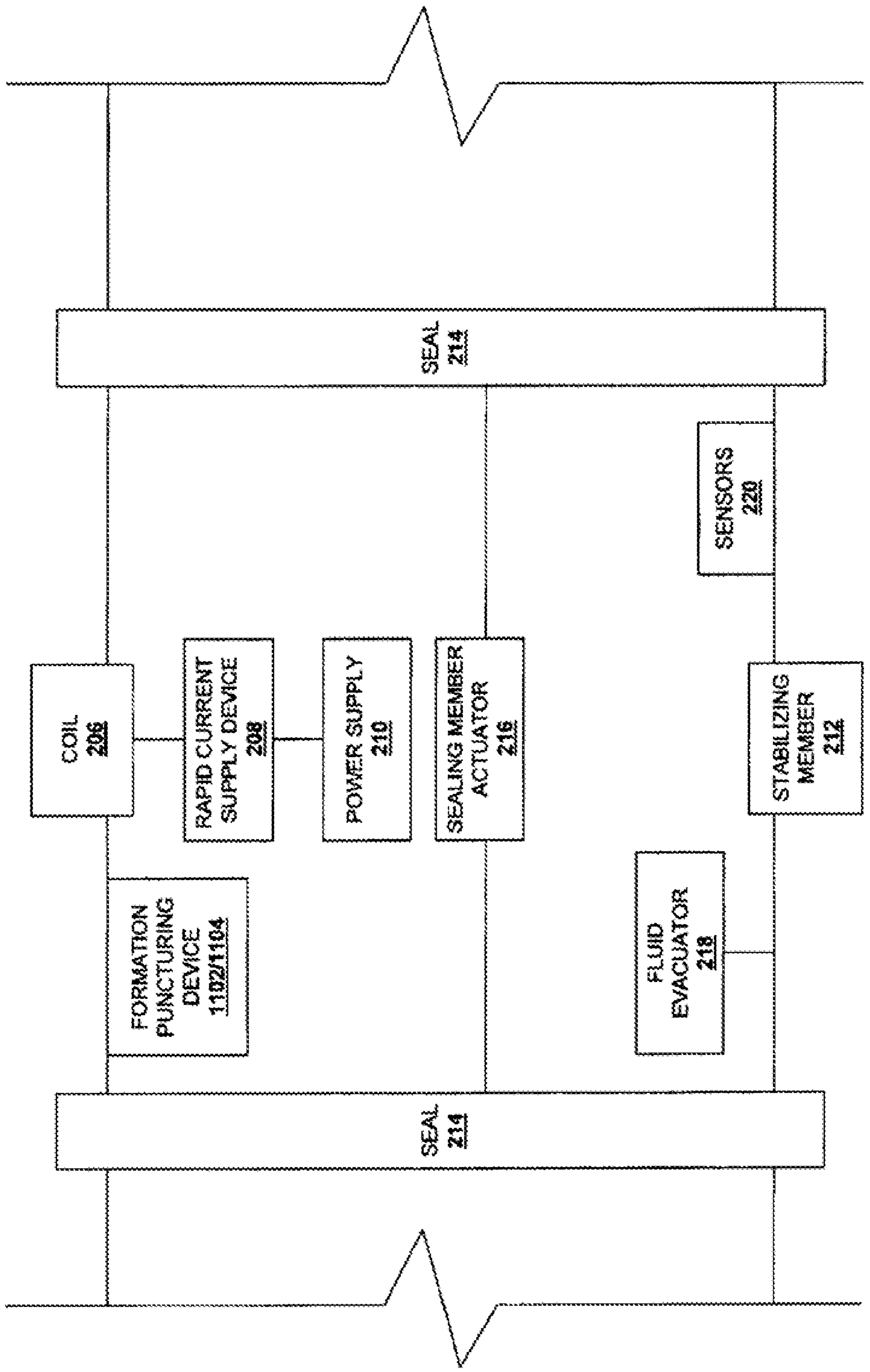
FIG. 11*c* is a schematic view illustrating an embodiment of the electromagnetic perforation devices of FIGS. 11*a* and 11*b*.
Figure 11D:
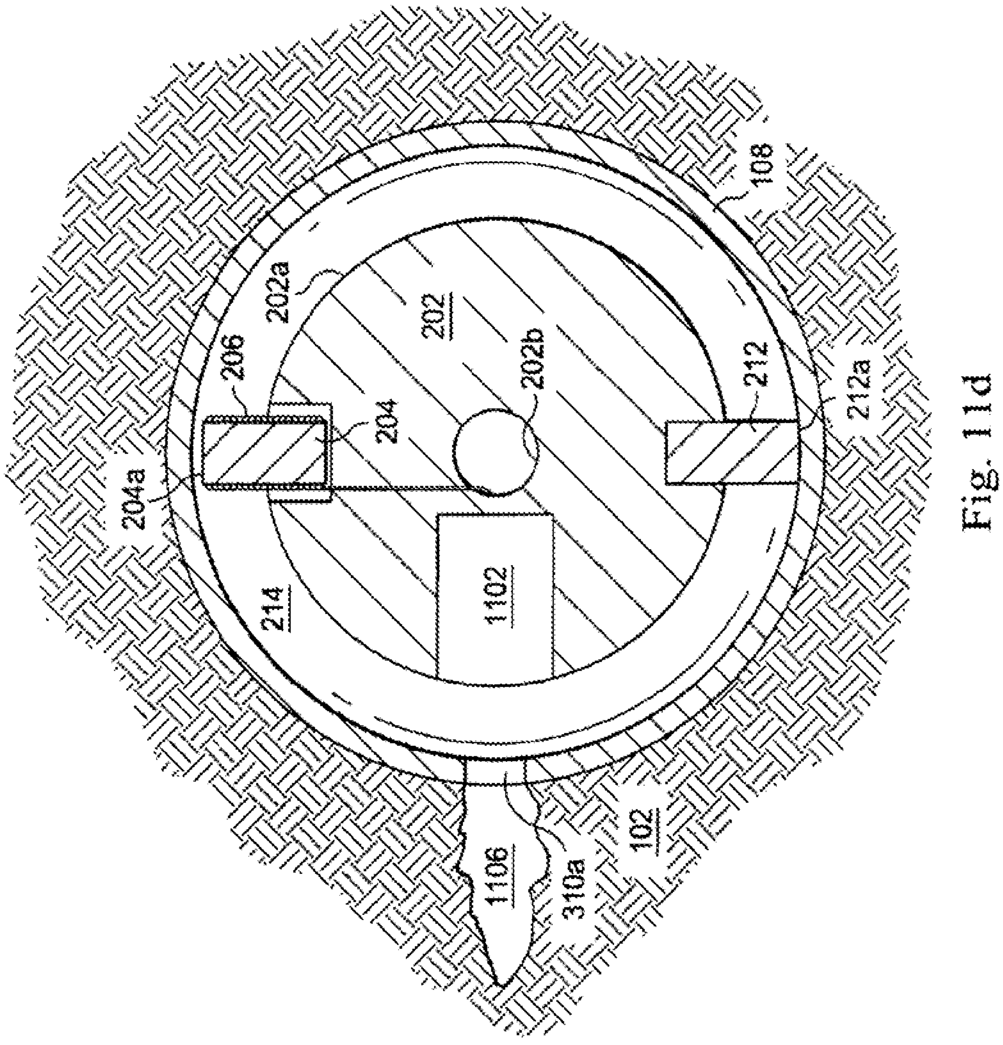
FIG. 11*d* is a cross-sectional view illustrating an embodiment of the electromagnetic perforation device of FIG. 11*a* puncturing a formation through a perforation.
Figure 11E:
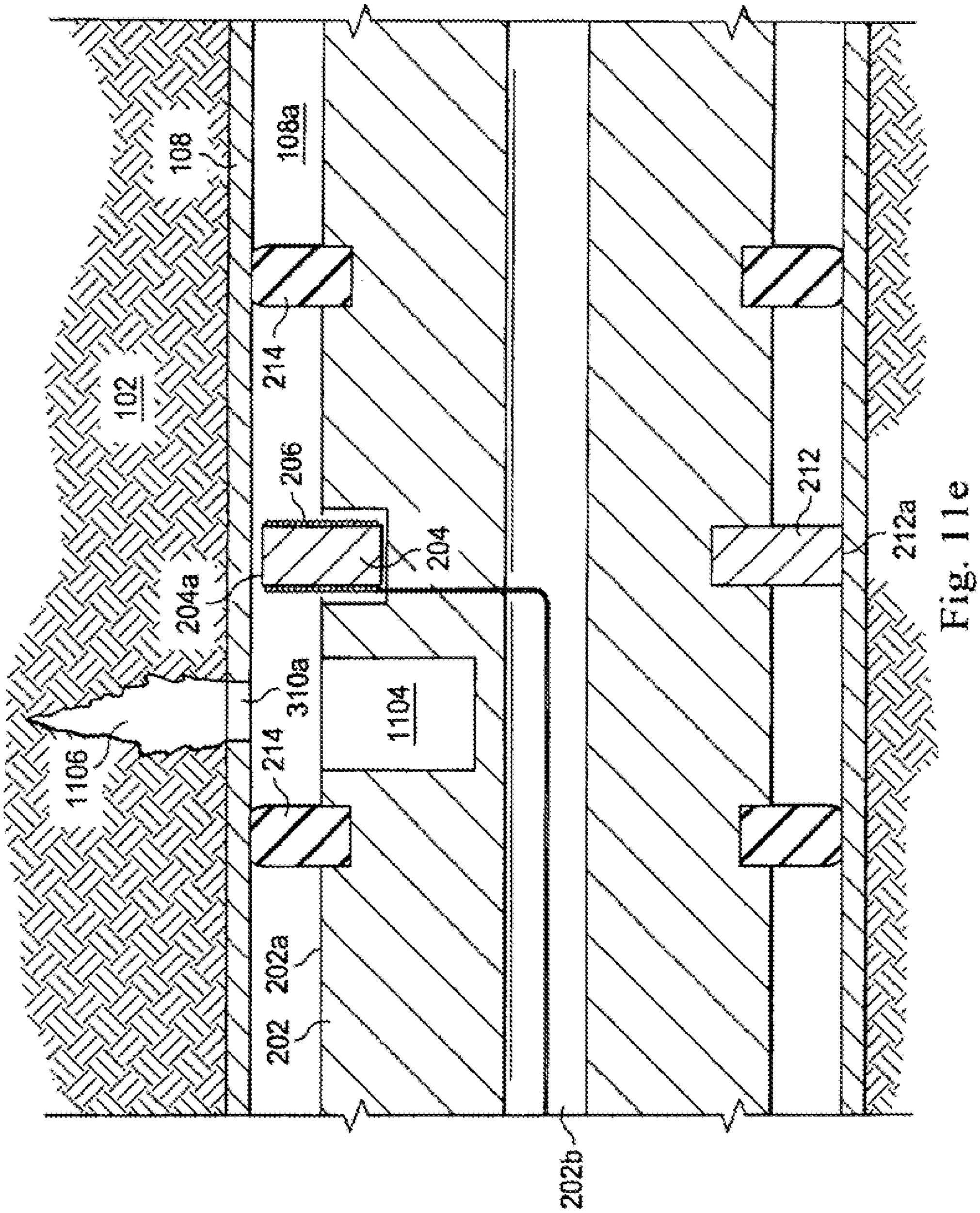
FIG. 11*e* is a cross-sectional view illustrating an embodiment of the electromagnetic perforation device of FIG. 11*b* puncturing a formation through a perforation.

Referring now to FIGS. 11*a*, 11*b*, 11*e*, 11*d*, and 11*e*, a electromagnetic perforation device 1100 is illustrated that is substantially similar in structure and operation to the electromagnetic perforation device 200, described above with reference to FIGS. 2*a*, 2*b*, 2*c*, 2*d*, 3*a*, 3*b*, 3*c*, and 3*d*, with the provision of a formation puncturing device 1102 or 1104. FIG. 11*a* illustrates the electromagnetic perforation device 1100 with the formation puncturing device 1102 circumferentially spaced apart from the coil 206. FIG. 11*b* illustrates the electromagnetic perforation device 1100 with the formation puncturing device 1102 longitudinally spaced apart from the coil 206. In an embodiment, the formation puncturing device 1100 may include, for example, a water jet or other formation puncturing device known in the art. In operation, the electromagnetic perforation device 1100 operates according to the method 300, discussed above. After the well easing 108 is perforated in block 310 of the method 300, the mandrel 202 is moved such that the formation puncturing device 1102 or 1104 is positioned adjacent the perforation 310*a* and the formation puncturing device 1102 or 1104 is then activated such that the formation 102 is punctured to provide connectivity 1106 between the casing passageway 108*a* and the formation 102, as illustrated in FIGS. 11*d* and 11*e*. The formation puncturing devices 1102 and/or 1104 may be desireable when the perforations created by the electromagnetic perforation device 1100 do not provide proper connectivity between the formation 102 and the casing passageway 108*a* such that oil or gas can be removed from the formation 102. Thus, a electromagnetic perforation device has been described that allows a well casing to be perforated quickly and precisely without the need for explosives that can introduce debris in the system and increase the danger in operating the system.

Those skilled in the art will appreciate that although the above described system and method have been described for use in a wellbore, it can be utilized to perforate or joint other types of tubulars within the scope of the invention. Likewise, although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An electromagnetic device for well casings, said device comprising:

a mandrel;

a coil core carried by and radially extending from said mandrel, said coil core having a distal end and a proximal end;

a coil disposed on the coil core;

a current supply device coupled to the coil; and a power supply coupled to the current supply device;

wherein the current supply device is operable to supply a current to the coil to generate an electromagnetic field therein, said electromagnetic field disposed to create a magnetic field in said casing to at least one of perforate a casing or weld a casing from within said casing.

2. The device of claim 1, further comprising a stabilizing member carried by said mandrel and capable of extending from said mandrel to engage the casing.

3. The device of claim 2, wherein said stabilizing member is spaced apart on the mandrel from the coil core.

4. The device of claim 1, wherein said coil comprises wire wrapped around at least a portion of the distal end of said coil core.

5. The device of claim 1, wherein said coil core is an elongated cylinder having a circular cross-section.

6. A wellbore system, comprising:

a formation defining a wellbore;

a well casing defining a casing passageway and located in the wellbore; a current supply device;

a power supply coupled to the current supply device; and

Customer No. 27683 an electromagnetic perforation device disposed in said casing passageway, said electromagnetic perforation device comprising:

a mandrel;

a coil core carried by and radially extending from said mandrel, said coil core having a distal end and a proximal end;

a coil disposed on the coil core and coupled to said current supply device;

wherein the current supply device is operable to supply a current to the coil to create an electromagnetic field in said coil and create a magnetic field in said casing.

7. The drilling system of claim 6, wherein a portion of said well casing is formed of conductive material, wherein said electromagnetic perforation device is disposed in the well casing so that said distal end of said coil core is positioned adjacent the conductive portion of the well case.

8. The drilling system of claim 6, wherein a portion of said well casing is formed of conductive material, said system further comprising a stabilizing member carried by said mandrel spaced apart from said coil core, said stabilizer extending from said mandrel to engage the well casing, wherein said electromagnetic perforation device is disposed in the well casing so that said distal end of said coil core is positioned adjacent the conductive portion of the well case.

9. The system of claim 6, further comprising a stabilizing member located on an opposite side of the mandrel from the coil core.

10. The system of claim 9, wherein the coil located on the coil core comprises a first coil, and wherein the device further comprises a second coil located on the stabilizing member and coupled to the current supply device, wherein the current supply device is operable to supply a current to the second coil to create an electromagnetic field that induces a magnetic field in the well casing, and wherein the electromagnetic field and the magnetic field are operable to produce a plurality of magnetic forces that are sufficient to overcome a yield strength of the well casing and perforate the well casing.

11. The system of claim 6, wherein the well casing is fabricated from a first material, and wherein the well casing further comprises a perforation section that is fabricated from a second material that is different from the first material.

12. The system of claim 6, wherein the well casing comprises a first thickness, and wherein the well casing further comprises a perforation section that comprises a second thickness that is smaller than the first thickness.

13. A wellbore system, comprising:

a formation defining a wellbore;

a well casing defining a casing passageway and located in the wellbore; a current supply device;

a power supply coupled to the current supply device;

an electromagnetic perforation device disposed in said casing passageway, said electromagnetic perforation device comprising:

a mandrel;

a coil core carried by said mandrel, said coil core having a distal end and a proximal end;

a coil disposed on the coil core and coupled to said current supply device;

wherein the current supply device is operable to supply a current to the coil to create an electromagnetic field therein;

a plurality of sealing members carried by the mandrel and disposed to engage the well casing, wherein the coil core and the coil are carried by the mandrel between at least two sealing members; and a fluid evacuator carried by the mandrel and operable to evacuate a fluid from a volume defined between the at least two sealing members.

14. The wellbore system of claim 13, wherein a portion of said well casing is formed of conductive material, wherein said electromagnetic perforation device is disposed in the well casing so that said distal end of said coil core is positioned adjacent the conductive portion of the well case.

15. The wellbore system of claim 13, wherein a portion of said well casing is formed of conductive material, said system further comprising a stabilizing member carried by said mandrel spaced apart from said coil core, said stabilizer extending from said mandrel to engage the well casing, wherein said electromagnetic perforation device is disposed in the well casing so that said distal end of said coil core is positioned adjacent the conductive portion of the well case.

16. The wellbore system of claim 13, further comprising a stabilizing member located on an opposite side of the mandrel from the coil core.

17. The system of claim 16, wherein the coil located on the coil core comprises a first coil, and wherein the device further comprises a second coil located on the stabilizing member and coupled to the current supply device, wherein the current supply device is operable to supply a current to the second coil to create an electromagnetic field that induces a magnetic field in the well casing, and wherein the electromagnetic field and the magnetic field are operable to produce a plurality of magnetic forces that are sufficient to overcome a yield strength of the well casing and perforate the well casing.

18. The wellbore system of claim 13, wherein the well casing is fabricated from a first material, and wherein the well casing further comprises a perforation section that is fabricated from a second material that is different from the first material.

19. The wellbore system of claim 13, wherein the well casing comprises a first thickness, and wherein the well casing further comprises a perforation section that comprises a second thickness that is smaller than the first thickness.

* * * * *